(12) United States Patent
Jeon et al.

(10) Patent No.: US 12,153,758 B2
(45) Date of Patent: Nov. 26, 2024

(54) DISPLAY DEVICE

(71) Applicant: SAMSUNG DISPLAY CO., LTD., Yongin-si (KR)

(72) Inventors: Hyun Jee Jeon, Yongin-si (KR); Sang Hyun Lim, Yongin-si (KR)

(73) Assignee: SAMSUNG DISPLAY CO., LTD, Yongin-si (KR)

( * ) Notice: Subject to any disclaimer, the term of this patent is extended or adjusted under 35 U.S.C. 154(b) by 0 days.

(21) Appl. No.: 18/446,679

(22) Filed: Aug. 9, 2023

(65) Prior Publication Data
US 2024/0160314 A1    May 16, 2024

(30) Foreign Application Priority Data

Nov. 11, 2022   (KR) .......................... 10-2022-0150828

(51) Int. Cl.
*G06F 3/045*   (2006.01)
*G06F 3/041*   (2006.01)
*G06F 3/044*   (2006.01)

(52) U.S. Cl.
CPC ........ *G06F 3/04166* (2019.05); *G06F 3/0412* (2013.01); *G06F 3/0446* (2019.05)

(58) Field of Classification Search
None
See application file for complete search history.

(56) References Cited

U.S. PATENT DOCUMENTS

2011/0193820 A1* 8/2011 Chen ..................... G06F 3/0412
                                                                345/173
2022/0334700 A1* 10/2022 Lim ..................... G06F 3/03545

FOREIGN PATENT DOCUMENTS

KR    10-2007-0080814        8/2007

* cited by examiner

*Primary Examiner* — Carl Adams
(74) *Attorney, Agent, or Firm* — F. Chau & Associates, LLC

(57) ABSTRACT

A display device includes a display layer, a touch layer including a plurality of driving electrodes and a plurality of sensing electrodes, and a touch driving circuit supplying touch driving signals to the plurality of driving electrodes, receiving touch signals from the plurality of sensing electrodes, and generating a touch sensing signal including first and second touch sensing signals. The touch driving circuit receives one of the touch signals, detects first sensed voltages of the one touch signal every first cycle of the first touch sensing signal to calculate a phase delay amount of the one touch signal, delays a phase of the second touch sensing signal based on the phase delay amount, calculates second sensed voltages of the one touch signal every second cycle of the second touch sensing signal different from the first cycle, and recognizes a touch input based on the second sensed voltages.

20 Claims, 22 Drawing Sheets

DU: SUB, TFTL, EML, TFEL

DISPLAY DEVICE

CROSS-REFERENCE TO RELATED APPLICATION

This U.S. non-provisional patent publication application claims priority under 35 U.S.C. § 119 to Korean Patent Application No. 10-2022-0150828, filed on Nov. 11, 2022, the disclosure of which is incorporated by reference in its entirety herein.

1. TECHNICAL FIELD

Embodiments of the present disclosure relate to a display device.

2. DISCUSSION OF RELATED ART

As the information society develops, the demand for display devices for displaying images has increased and diversified. For example, display devices have been applied to various electronic devices such as smartphones, digital cameras, laptop computers, navigation devices, and smart televisions. The display devices may be flat panel display devices such as liquid crystal display devices, field emission display devices, or organic light emitting display devices. Among such flat panel display devices, a light emitting display device may display an image without a backlight unit because pixels of the display panel include light emitting elements.

Recently, mainly in smartphones or tablet personal computers (PCs), a touch driving unit recognizing a touch input on a touch panel has been widely applied as an input device of a display device. The touch driving unit decides whether the touch input has been received, and calculates a position of the touch input as coordinates. The touch driving unit may need information on a phase and an amplitude of a touch signal of the touch panel to determine whether the touch input has been received and to calculate the corresponding position.

SUMMARY

At least one embodiment of the present disclosure provides a display device in which a touch driving unit (e.g., a touch driving circuit) calculates information on an amplitude of a touch signal from a touch panel and recognizes a touch position of a user on the touch panel without using a separate quadrature amplitude modulation circuit.

According to an embodiment of the present disclosure, a display device includes a display layer including a plurality of pixels, a touch layer disposed on the display layer and including a plurality of driving electrodes and a plurality of sensing electrodes, and a touch driving circuit supplying touch driving signals to the plurality of driving electrodes, receiving touch signals from the plurality of sensing electrodes, and generating a touch sensing signal including first and second touch sensing signals. The touch driving circuit receives one of the touch signals, detects first sensed voltages of the one touch signal every first cycle of the first touch sensing signal to calculate a phase delay amount of the one touch signal, delays a phase of the second touch sensing signal based on the phase delay amount, calculates second sensed voltages of the one touch signal every second cycle of the second touch sensing signal different from the first cycle, and recognizes a touch input based on the second sensed voltages.

The first cycle may be greater than the second cycle.

A cycle of the one touch signal may be the same as the second cycle.

The second sensed voltages of the one touch signal detected every second cycle of the second touch sensing signal may be the same as an amplitude of the one touch signal.

The touch sensing signal may include a first touch sensing section and a second touch sensing section. The first touch sensing signal may be generated during the first touch sensing section and the second touch sensing signal is generated during the second touch sensing section.

The first touch sensing section may be shorter than the second touch sensing section.

The touch sensing signal may further include a phase delay section for delaying the phase of the second touch sensing signal according to the phase delay amount.

The phase delay section may be disposed between the first touch sensing section and the second touch sensing section.

The touch driving circuit may calculate an interval corresponding to a maximum sensed voltage of the first sensed voltages of the one touch signal detected every first cycle of the first touch sensing signal, as the phase delay amount.

The touch sensing signal may include a plurality of frame periods, and the first touch sensing signal may be generated in at least one of a plurality of frame periods of the touch sensing signal.

The touch driving circuit may include an amplitude detector calculating the first sensed voltages of the one touch signal according to the first touch sensing signal, and a detection frequency controller calculating the phase delay amount of the one touch signal according to the first sensed voltages of the one touch signal.

The detection frequency controller may output the second touch sensing signal to the amplitude detector according to a phase delay amount of the one touch signal.

The amplitude detector may detect the second sensed voltages of the one touch signal according to the second touch sensing signal to generate touch sensing data.

The touch driving circuit may further include a digital signal unit generating touch data having a digital waveform based on the touch sensing data.

According to an embodiment of the present disclosure, a display device includes a display layer including a plurality of pixels, a touch layer disposed on the display layer and including a plurality of driving electrodes and a plurality of sensing electrodes, and a touch driving circuit supplying touch driving signals to the plurality of driving electrodes, receiving touch signals from the plurality of sensing electrodes, and generating a touch sensing signal including first and second touch sensing signals. The touch driving circuit receives one of the touch signals, detects first sensed voltages of the one touch signal every first cycle of the first touch sensing signal to calculate a phase delay amount of the one touch signal, and detects second sensed voltages of the one touch signal every second cycle of the second touch sensing signal different from the first cycle to calculate a touch input. A difference between a phase of the first touch sensing signal and a phase of the second touch sensing signal is the same as the phase delay amount.

The first cycle may be greater than the second cycle.

A cycle of the one touch signal may be the same as the second cycle.

The touch sensing signal may include a first touch sensing section and a second touch sensing section. The first touch sensing signal may be generated during the first touch sensing section and the second touch sensing signal may be generated during the second touch sensing section.

The first touch sensing section may be shorter than the second touch sensing section.

The touch sensing signal may further include a phase delay section for delaying the phase of the second touch sensing signal according to the phase delay amount.

With a display device according to an embodiment, a touch driving circuit may calculate information on an amplitude of a touch signal and recognize a user's touch position by detecting sensed voltages of a touch signal according to touch sensing signals having different cycles without a separate quadrature amplitude modulation circuit.

BRIEF DESCRIPTION OF THE DRAWINGS

The above and other features of the present disclosure will become more apparent by describing in detail embodiments thereof, with reference to the accompanying drawings, in which.

DETAILED DESCRIPTION OF THE EMBODIMENTS

Figure 1:
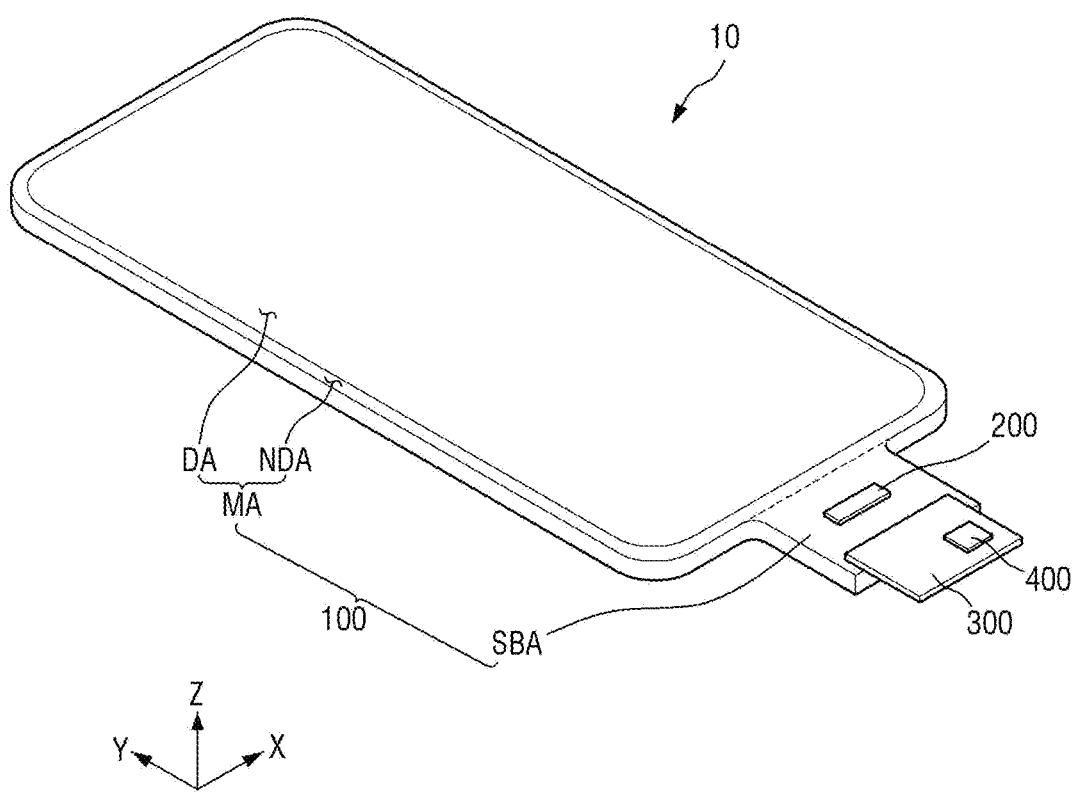
FIG. 1 is a schematic plan view of a display device according to an embodiment.

Embodiments of the present disclosure will be described more fully hereinafter with reference to the accompanying drawings. Like reference numerals may refer to like elements throughout the specification and the accompanying drawings.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art. Other uses of these terms and similar terms to describe the relationship between components should be interpreted in a like fashion.

It will be understood that when a component, such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as "covering" another component, it can be the only component covering the other component, or one or more intervening components may also be covering the other component. Other words use to describe the relationship between elements may be interpreted in a like fashion.

It will be further understood that descriptions of features or aspects within each embodiment are available for other similar features or aspects in other embodiments, unless the context clearly indicates otherwise. Accordingly, all features and structures described herein may be mixed and matched in any desirable manner.

As used herein, the singular forms "a", "an" and "the" are intended to include the plural forms as well, unless the context clearly indicates otherwise.

When a feature is said to extend, protrude, or otherwise follow a certain direction, it will be understood that the feature may follow said direction in the negative, i.e., opposite direction. Accordingly, the feature is not limited to follow exactly one direction, and may follow along an axis formed by the direction, unless the context clearly indicates otherwise.

Figure 2:
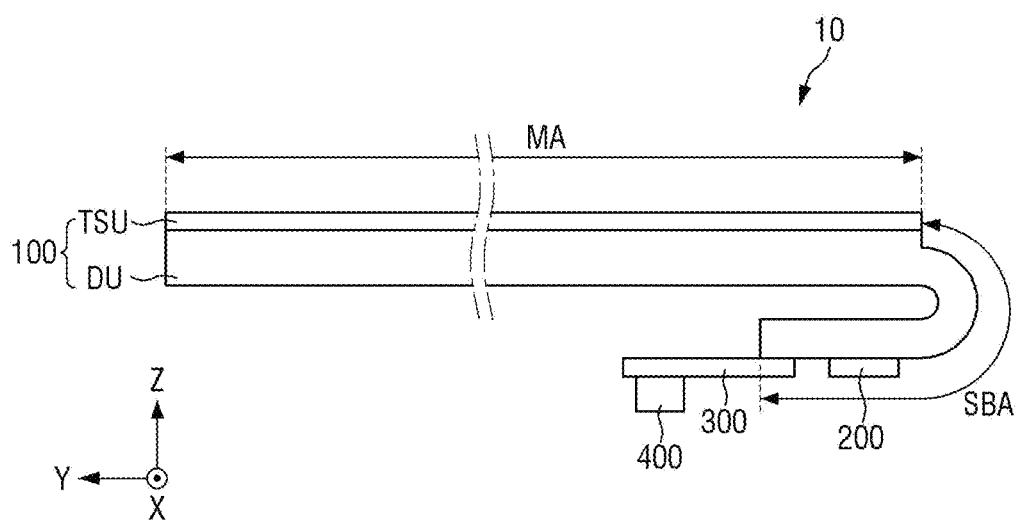
FIG. 2 is a schematic cross-sectional view of the display device according to an embodiment.

FIG. 1 is a schematic plan view of a display device according to an embodiment. FIG. 2 is a schematic cross-sectional view of the display device according to an embodiment.

In the drawings, a first direction X is a direction parallel to one side of a display device 10 in a plan view, and refers to a short side direction of the display device 10. A second direction Y is a direction parallel to the other side in contact with one side of the display device 10 in a plan view, and refers to a long side direction of the display device 10. A third direction Z refers to a thickness direction of the display device 10. However, it is to be understood that directions mentioned in embodiments refer to relative directions, and embodiments are not limited to the mentioned directions.

The display device 10 may include various electronic devices that provide display screens. For example, the display device 10 may be applied to portable electronic devices such as mobile phones, smartphones, tablet personal computers (PCs), mobile communication terminals, electronic notebooks, electronic books, portable multimedia players (PMPs), navigation devices, and ultra mobile PCs (UMPCs). For example, the display device 10 may be applied as a display unit DU of televisions, laptop computers, monitors, billboards, or the Internet of Things (IOTs). In addition, the display device 10 may be applied to wearable devices such as smart watches, watch phones, glasses-type displays, and head mounted displays (HMDs).

Referring to FIG. 1, the display device 10 may have a shape similar to a rectangular shape, in a plan view. For example, the display device 10 may have a shape similar to a rectangular shape, in a plan view, having short sides in the first direction X and long sides in the second direction Y. A corner where the short side in the first direction X and the long side in the second direction Y meet may be rounded with a predetermined curvature or right-angled. The shape of the display device 10 in a plan view is not limited to the rectangular shape, and may be a shape similar to other polygonal shapes, a circular shape, or an elliptical shape.

At least one of a front surface and a rear surface of the display device 10 may be a display surface. Here, the "front surface" is a surface positioned on one side of one plane, and refers to a surface positioned on one side in the third direction Z in the drawings, and the "rear surface" is a surface positioned on the other side of one plane, and refers to a surface positioned on the other side in the third direction Z in the drawings. The display device 10 may be a double-sided display device 10 in which display is performed on both the front surface and the rear surface, but an exemplary embodiment in which the display surface is positioned on the front surface of the display device 10 will hereinafter be mainly described.

The display device 10 includes a display panel 100 providing a display screen, a display driving unit 200 (e.g., a driving circuit), a circuit board 300, and a touch driving unit 400 (e.g., a driving circuit).

The display panel 100 may have a shape similar to a rectangular shape in a plan view. For example, the display panel 100 may have a shape similar to a rectangular shape, in a plan view, having short sides in the first direction X and long sides in the second direction Y. A corner where the short side in the first direction X and the long side in the second direction Y meet may be rounded with a predetermined curvature or right-angled. The shape of the display panel 100 in a plan view is not limited to the rectangular shape, and may be a shape similar to other polygonal shapes, a circular shape, or an elliptical shape. In addition, the display panel 100 may also be flexibly formed to be curved or bent.

The display panel 100 may include a main area MA and a sub-area SBA.

The main area MA may include a display area DA including pixels displaying an image and a non-display area NDA disposed around the display area DA. The display area DA may emit light from a plurality of emission areas or a plurality of opening areas. For example, the display panel 100 may include pixel circuits including switching elements, a pixel defining film defining emission areas or opening areas, and self-light emitting elements.

The non-display area NDA may be an area outside the display area DA. The non-display area NDA may be defined as an edge area of the main area MA of the display panel 100. The non-display area NDA may include a gate driver (e.g., a driver circuit) supplying gate signals to gate lines. For example, no pixels are present in the non-display area NDA.

The sub-area SBA may extend from one side of the main area MA. The sub-area SBA may be bent to overlap the main area MA in the third direction Z. The sub-area SBA may include the display driving unit 200 and pads connected to the circuit board 300.

Referring to FIG. 2, the display panel 100 includes a display unit DU (e.g., a display layer) and a touch unit TSU (e.g., a touch layer).

Figure 4:
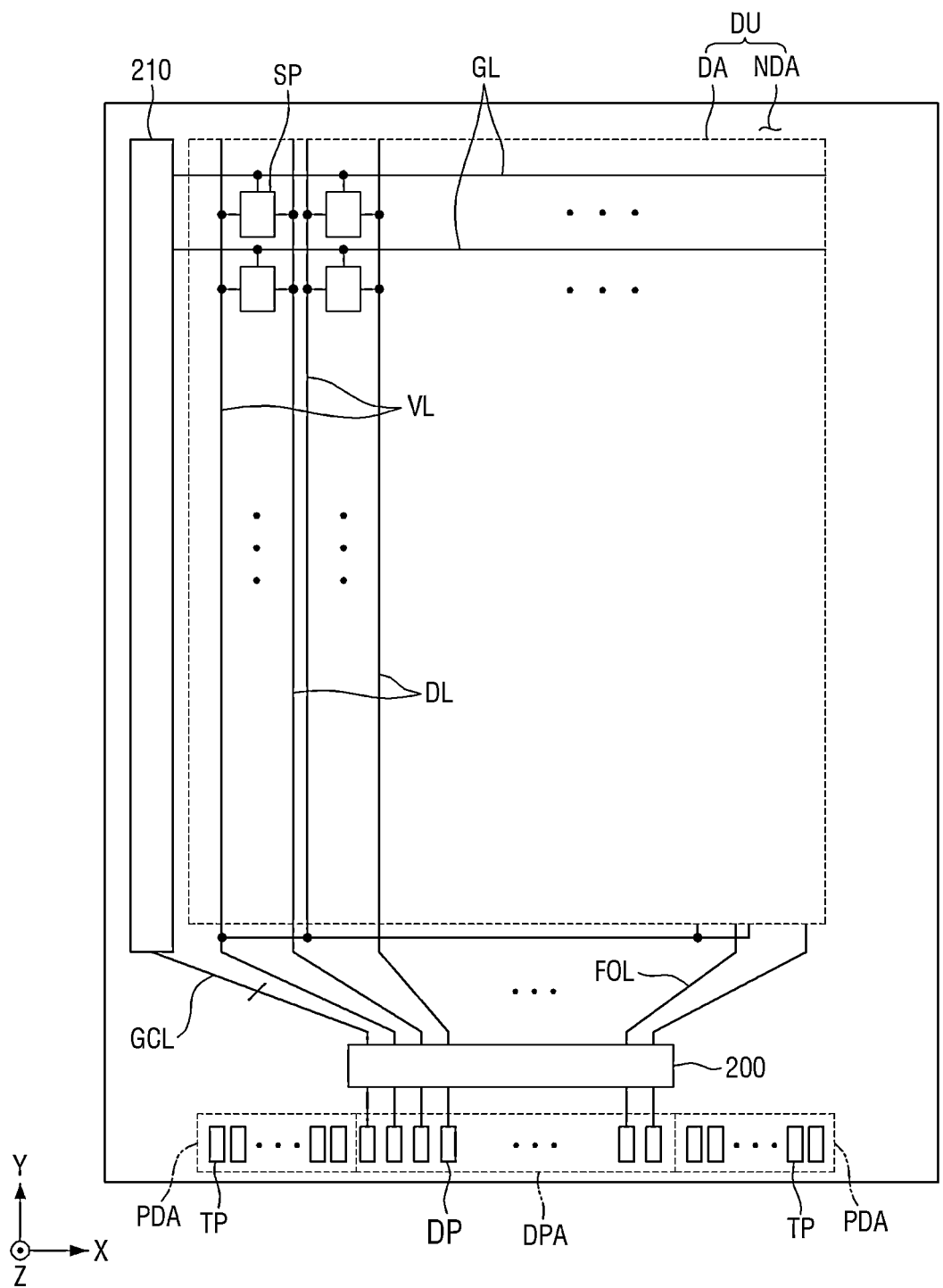
FIG. 4 is a schematic plan view illustrating the display unit of the display device according to an embodiment.

The display unit DU may include a plurality of pixels SP (see FIG. 4). The pixel SP is a basic unit for displaying a screen or part of an image. The pixels SP may include red pixels, green pixels, and blue pixels, but are not limited thereto. The plurality of pixels SP may be alternately arranged in a plan view. For example, the pixels SP may be arranged in a matrix shape, but are not limited thereto.

The touch unit TSU may be disposed on the display unit DU. The touch unit TSU may include a plurality of sensing electrodes RE and a plurality of driving electrodes TE (see FIG. 5) for sensing a user's touch in a capacitive manner, a plurality of touch driving lines TL connecting the plurality of driving electrodes TE and the touch driving unit 400 to each other, and a plurality of touch sensing lines RL. The touch unit TSU is a layer for sensing a touch input and may function as a touch member. The touch unit TSU may decide whether or not the touch input has been generated, and may calculate a corresponding position as touch input coordinates. A detailed description of the display unit DU and the touch unit TSU will be described later with reference to FIGS. 4 to 7.

The display unit DU and the touch unit TSU may be disposed to overlap each other. That is, the display area DA may be an area in which both of the display and the sensing of the touch input are performed. The plurality of driving electrodes TE of the touch unit TSU may be disposed in a touch area overlapping the display area DA.

The sub-area SBA of the display panel 100 may extend from one side of the main area MA. The sub-area SBA may include a flexible material that may be bent, folded, and rolled. For example, when the sub-area SBA is bent, the sub-area SBA may overlap the main area MA in the third direction (Z-axis direction). The sub-area SBA may include the display driving unit 200 and pads connected to the circuit board 300.

Referring to FIG. 1 again, the display driving unit 200 may be disposed in the non-display area NDA of the display panel 100. In addition, the display driving unit 200 may be formed as an integrated circuit (IC) and be mounted on the display panel 100 in a chip on plastic (COP) manner or a chip on glass (COG) manner.

The display driving unit 200 may output data signals and voltages for driving the display panel 100. The display driving unit 200 may supply data voltages to data lines. The display driving unit 200 may supply source voltages to power lines and supply gate control signals to the gate driver.

The circuit board 300 may be disposed in the non-display area NDA of the display panel 100. Lead lines of the circuit board 300 may be electrically connected to the pads of the display panel 100. The circuit board 300 may be a flexible printed circuit board, a printed circuit board, or a flexible film such as a chip on film.

The circuit board 300 may include a plurality of conductive lines for transferring signals from a main circuit board to the circuit board 300 or electrically connecting the touch driving unit 400 and the plurality of driving electrodes TE and sensing electrodes RE of a touch layer to each other.

The touch driving unit 400 may be disposed in the non-display area NDA of the display panel 100. The touch driving unit 400 may be mounted on the circuit board 300. The touch driving unit 400 may supply touch driving signals TX to a plurality of driving electrodes of a touch panel and sense change amounts in capacitance between the plurality of driving electrodes.

The touch driving unit 400 may decide whether or not a touch input has been generated and calculate touch coordinates, based on the change amounts in capacitance between the plurality of driving electrodes TE and the plurality of sensing electrodes RE. The touch driving unit 400 may be formed as an integrated circuit (IC) and be mounted on the display panel 100 in a chip on plastic (COP) manner or a chip on glass (COG) manner.

Figure 3:
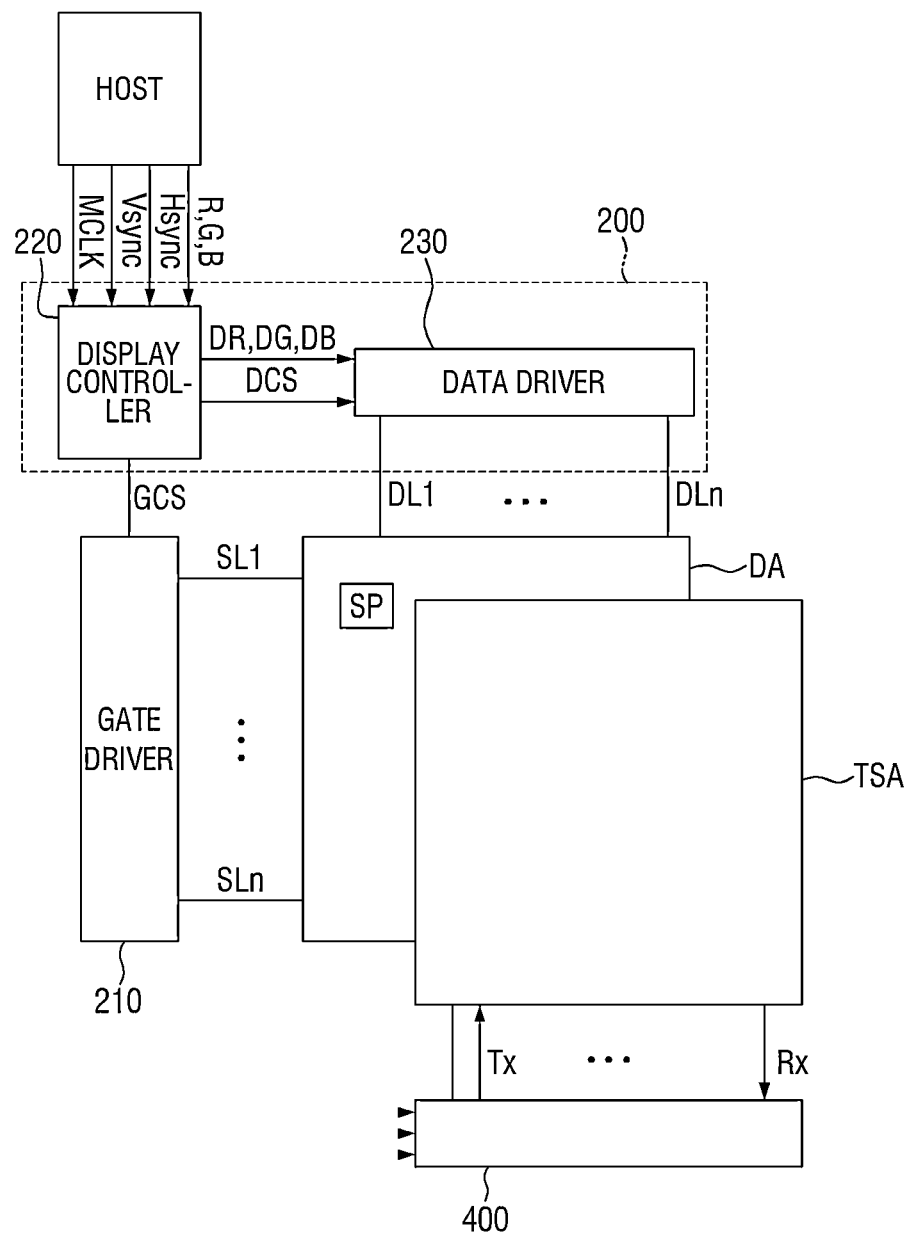
FIG. 3 is a conceptual diagram illustrating a display unit and a touch driving unit according to an embodiment.

FIG. 3 is a conceptual diagram illustrating a display unit and a touch driving unit according to an embodiment. FIG. 4 is a schematic plan view illustrating the display unit of the display device according to an embodiment.

Referring to FIGS. 3 and 4, the display device 10 includes the display panel 100 including the plurality of pixels SP, the display driving unit 200, and the touch driving unit 400.

Referring to FIG. 3, the display driving unit 200 may include a gate driver 210 (e.g., a driver circuit), a data driver 230 (e.g., a driver circuit), and a display controller 220 (e.g., a controller circuit).

The display controller 220 may receive input data R, G, and B and a timing control signal from an external device (e.g., host). The timing control signal may include a vertical synchronization signal Vsync indicating one frame period, a horizontal synchronization signal Hsync indicating one horizontal period, and a main clock MCLK repeated at a predetermined cycle. The input data R, G, and B may be RGB data including red image data, green image data, and blue image data. The display controller 220 may generate output data signals DR, DG, and DB and an internal control signal using the received input data R, G, and B and the timing control signal.

The internal control signal includes a data driver control signal DCS and a gate driver control signal GCS.

The display controller 220 may control an operation of the data driver 230 by providing the data driver control signal DCS to the data driver 230, and may control an operation of the gate driver 210 by providing the gate driver control signal GCS to the gate driver 210.

The data driver 230 may receive the output data signals DR, DG, and DB and the data driver control signal DCS from the display controller 220. The data driver 230 may generate data signals using the received output data signals DR, DG, and DB and data driver control signal DCS, and provide the generated data signals to the display panel 100. The data driver 230 may provide the data signals through a plurality of data lines DL (see FIG. 4 or DL1-DLn) connected to the display panel 100.

The gate driver 210 may receive the gate driver control signal GCS from the display controller 220. The gate driver 210 may generate gate signals using the received gate driver control signal GCS and may provide the generated gate signals to the display panel 100. The gate driver 210 may provide the gate signals through a plurality of gate lines GL (see FIG. 4) connected to the display panel 100. A detailed description of the plurality of data lines DL (see FIG. 4) and the plurality of gate lines GL (see FIG. 4) will be provided later with reference to FIG. 4.

The gate driver 210, the data driver 230, and the display controller 220 may be included in the display driving unit 200 for controlling an operation of the display panel 100. The gate driver 210, the data driver 230, and the display controller 220 may be formed as integrated circuits (ICs) and be mounted on the display driving unit 200.

The display panel 100 may receive the data signals from the data driver 230 and receive the gate signals from the gate driver 210. The display panel 100 may include the plurality of pixels SP (see FIG. 3) connected to the plurality of data lines DL (see FIG. 4) and the plurality of gate lines GL (see FIG. 4). Meanwhile, a frame frequency input to the display driving unit 200 may vary. For example, the frame frequency may vary within the range of 1 Hz to 240 Hz according to a host's or a user's selection. The display driving unit 200 may be driven at 60 Hz in a normal mode and 120 Hz in another mode according to a user's need.

A touch area TSA may include the plurality of driving electrodes TE, sensing electrodes RE, and the plurality of touch driving lines TL and touch sensing lines RL. The touch area TSA may sense a touch input by receiving electrical signals from the touch driving unit 400 disposed on the circuit board 300 through the plurality of touch driving lines TL or transmitting electrical signals sensed from the plurality of sensing electrodes RE to the touch driving unit 400 through the plurality of touch sensing lines RL. Specifically, the touch driving unit 400 may sense the touch input by converting analog electrical signals sensed in the touch area TSA into digital signals. A detailed description of the touch driving unit 400 will be described later with reference to FIG. 5.

Referring to FIG. 4, the display unit DU may include a display area DA and a non-display area NDA. The display unit DU may include the plurality of pixels SP and the plurality of gate lines GL and the plurality of data lines DL connected to the plurality of pixels SP.

The plurality of gate lines GL may supply the gate signals received from the gate driver 210 to the plurality of pixels SP. The plurality of gate lines GL may extend in the first direction X, and may be spaced apart from each other in the second direction Y crossing the first direction X.

The plurality of data lines DL may supply the output data signals DR, DG, and DB and the data signals received from the display driving unit 200 to the plurality of pixels SP. The plurality of data lines DL may extend in the second direction Y, and may be spaced apart from each other in the first direction X.

The non-display area NDA may surround the display area DA. For example, the non-display area NDA may include the gate driver 210 applying the gate signals to the plurality of gate lines GL, fan-out lines FOL connecting the plurality of data lines DL and the display driving unit 200 to each other, and display pads DP connected to the circuit board 300.

The display driving unit 200 may supply the gate driver control signal GCS to the gate driver 210 through a gate control line GCL, as described above. The gate driver 210 may generate a plurality of gate signals based on the gate driver control signal GCS, and may sequentially supply the plurality of gate signals to the plurality of gate lines GL according to a set order.

The display driving unit 200 may supply a first source voltage to first power lines VL through the data driver 230 and supply a second source voltage to second power lines. Each of the plurality of pixels SP may receive the first source voltage through the first power line VL and receive the second source voltage through the second power line. The first source voltage may be a predetermined high level voltage, and the second source voltage may be a voltage lower than the first source voltage.

A display pad area DPA and touch pad areas PDA may be disposed at an edge of the display panel 100. The display pad area DPA may include a plurality of display pads DP. The plurality of display pads DP may be connected to a main processor through the circuit board 300. The plurality of display pads DP may be connected to the circuit board 300 to receive digital video data, and may supply the digital video data to the display driving unit 200.

Figure 5:
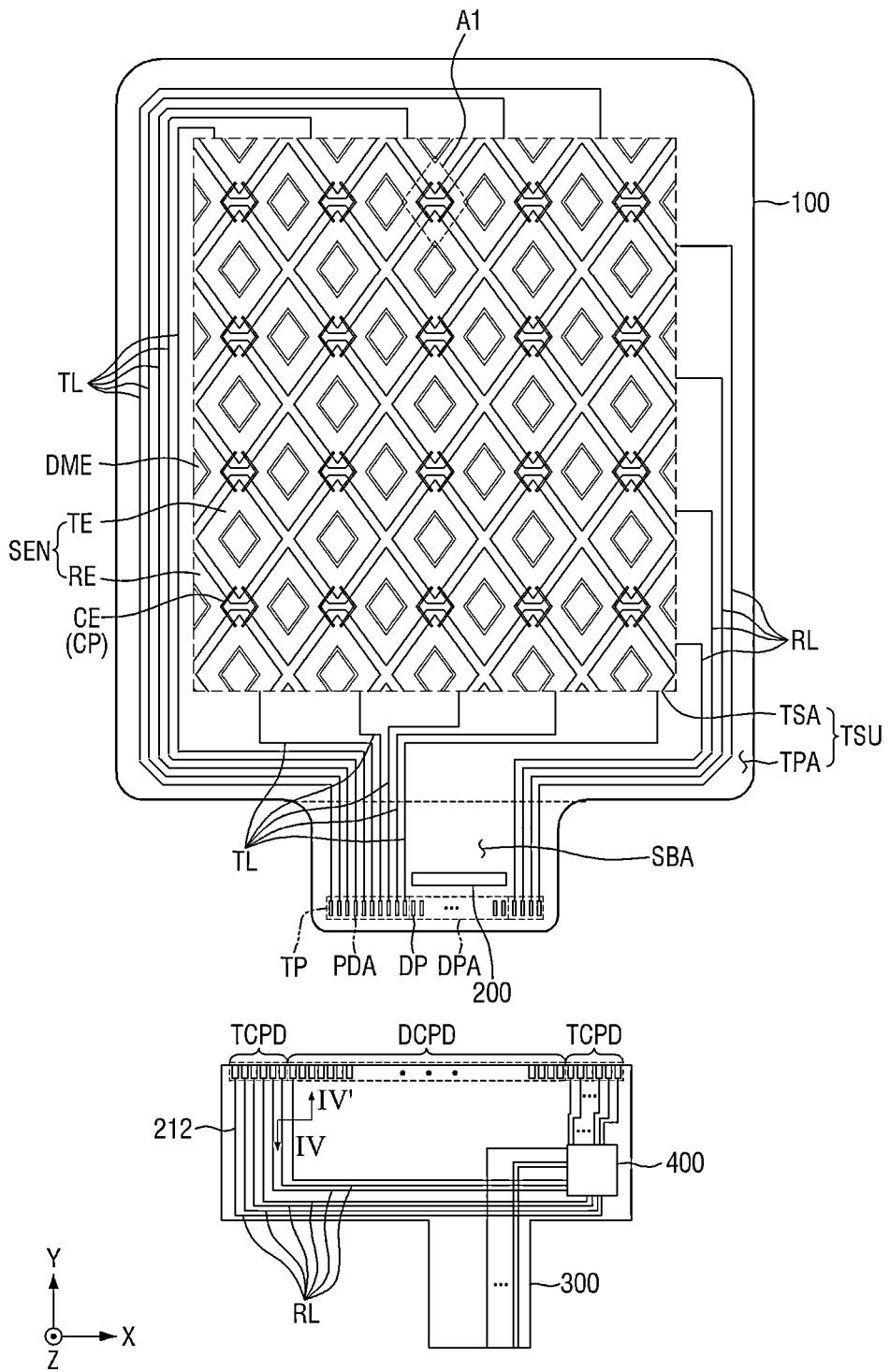
FIG. 5 is a plan view illustrating a touch unit of the display device according to an embodiment.

FIG. 5 is a plan view illustrating a touch unit of the display device according to an embodiment.

Referring to FIG. 5, the touch unit TSU may include a touch area TSA for sensing a user's touch and a touch peripheral area TPA disposed around the touch area TSA. The touch area TSA may overlap the display area DA of the display panel 100, and the touch peripheral area TPA may overlap the non-display area NDA of the display panel 100.

Referring to FIG. 5, the touch area TSA may include the plurality of driving electrodes TE, sensing electrodes RE, and the plurality of touch driving lines TL and touch sensing lines RL. The circuit board 300 may include first circuit pads DCPD connected to the display pads DP of the display panel 100, second circuit pads TCPD connected to touch pads TP of the display panel 100, and touch circuit lines 212 connecting the second circuit pads TCPD and the touch driving unit 400 to each other. Accordingly, the plurality of driving electrodes TE and sensing electrodes RE of the touch area TSA may be electrically connected to the touch driving unit 400 of the circuit board 300. The touch area TSA may sense a touch input by receiving electrical signals from the touch driving unit 400 disposed on the circuit board 300 through the plurality of touch driving lines TL and touch sensing lines RL or transmitting electrical signals sensed from the plurality of driving electrodes TE and sensing electrodes RE to the touch driving unit 400 through the plurality of touch driving lines TL and touch sensing lines RL.

The plurality of driving electrodes TE may be arranged in the first direction X and the second direction Y. The plurality of driving electrodes TE may be spaced apart from each other in the first direction X and the second direction Y. The driving electrodes TE adjacent to each other in the second direction Y may be electrically connected to each other through a bridge electrode CE.

The plurality of driving electrodes TE may be connected to the touch pads TP through the touch driving lines TL. The plurality of driving electrodes TE disposed in the touch area TSA may be connected to the touch pads TP through the touch driving lines TL. A plurality of driving lines TL may pass through the lower side of the touch peripheral area TPA or may extend to the touch pads TP via the upper side, the left side, and the lower side of the touch peripheral area TPA. The touch pads TP may be connected to the touch driving unit 400 through the circuit board 300.

The display pad area DPA and the touch pad areas PDA may be disposed at an edge of the sub-area SBA of the display panel 100. The display pad area DPA and the touch pad areas PDA may be electrically connected to the circuit board 300 using a low-resistance and high-reliability material such as an anisotropic conductive film.

The plurality of sensing electrodes RE may extend in the first direction X and may be spaced apart from each other in the second direction Y. The plurality of sensing electrodes RE may be arranged in the first direction X and the second direction Y, and the plurality of sensing electrodes RE adjacent to each other in the first direction X may be electrically connected to each other through a connection part.

The plurality of sensing electrodes RE may be connected to the touch pads TP through the plurality of touch sensing lines RL. For example, the plurality of sensing electrodes RE disposed on the right side of the touch area TSA may be connected to the touch pads TP through the plurality of touch sensing lines RL. The plurality of touch sensing lines RL may extend to the touch pads TP via the right side and the lower side of the touch peripheral area TPA. The touch pads TP may be connected to the touch driving unit 400 through the circuit board 300.

The plurality of driving electrodes TE and sensing electrodes RE may not hinder travel of light emitted from a display layer by including a planar pattern formed of a transparent conductive layer or a mesh pattern in which an opaque metal is used along an area in which light emitting elements are not disposed.

The touch driving signal TX may be applied from the touch driving unit 400 to each of the plurality of driving electrodes TE through any one of the plurality of touch driving lines TL. The touch driving unit 400 may receive a frame frequency synchronization signal Hsync_f and output the touch driving signal TX corresponding to a duty value. Thereafter, a mutual capacitance may be formed between the driving electrodes TE and the sensing electrodes RE adjacent to each other. When a touch input is applied or generated from the outside, a mutual capacitance value between the driving electrodes TE and the sensing electrodes RE adjacent to each other may change. The change in the mutual capacitance measured by the plurality of sensing electrodes RE may be transferred to the touch driving unit 400 through the plurality of touch sensing lines RL. Accordingly, the touch driving unit 400 may decide whether or not the touch input has been generated, and calculate a corresponding position as touch input coordinates. The touch sensing may be performed in a mutual capacitive manner, but is not limited thereto.

Figure 6:
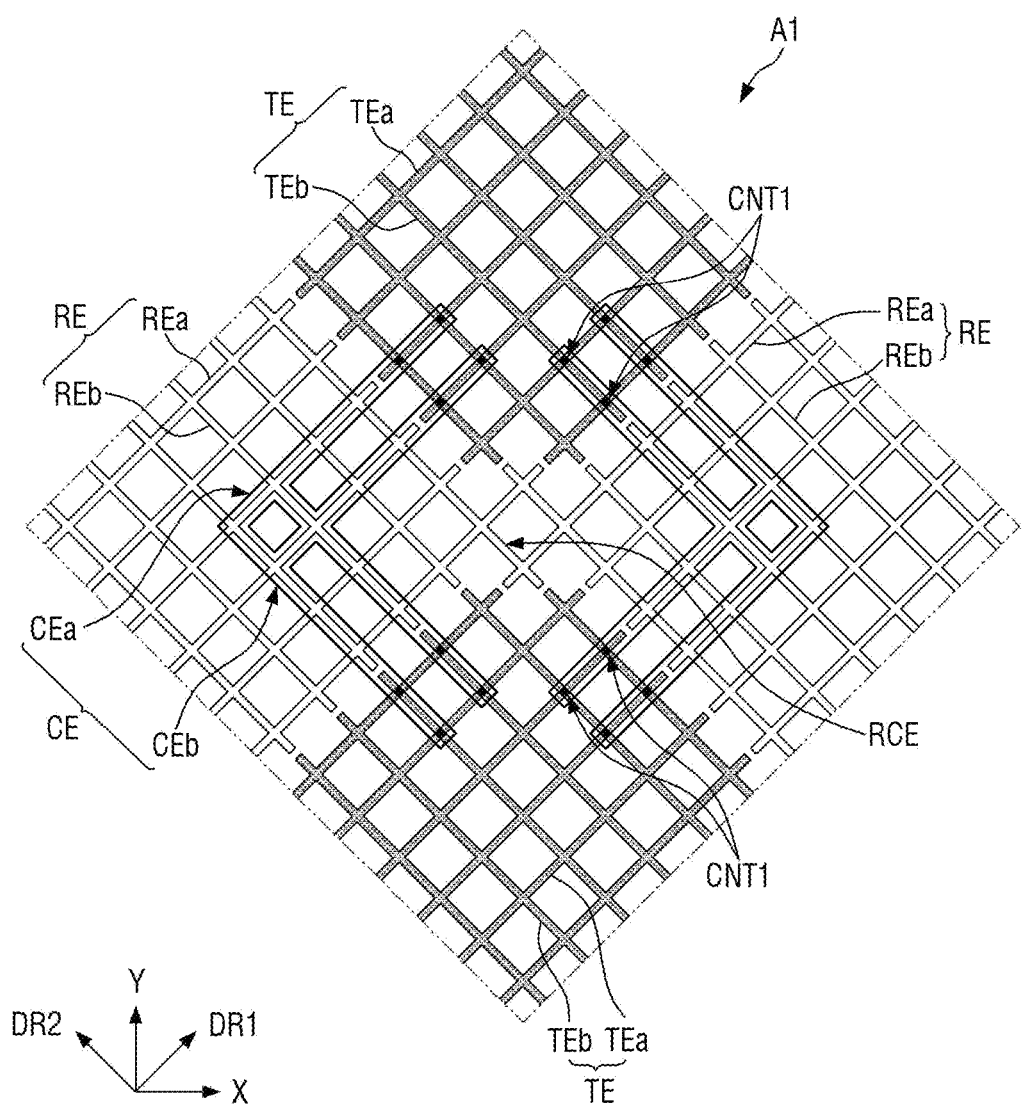
FIG. 6 is an enlarged view of area A1 of FIG. 5.
Figure 7:
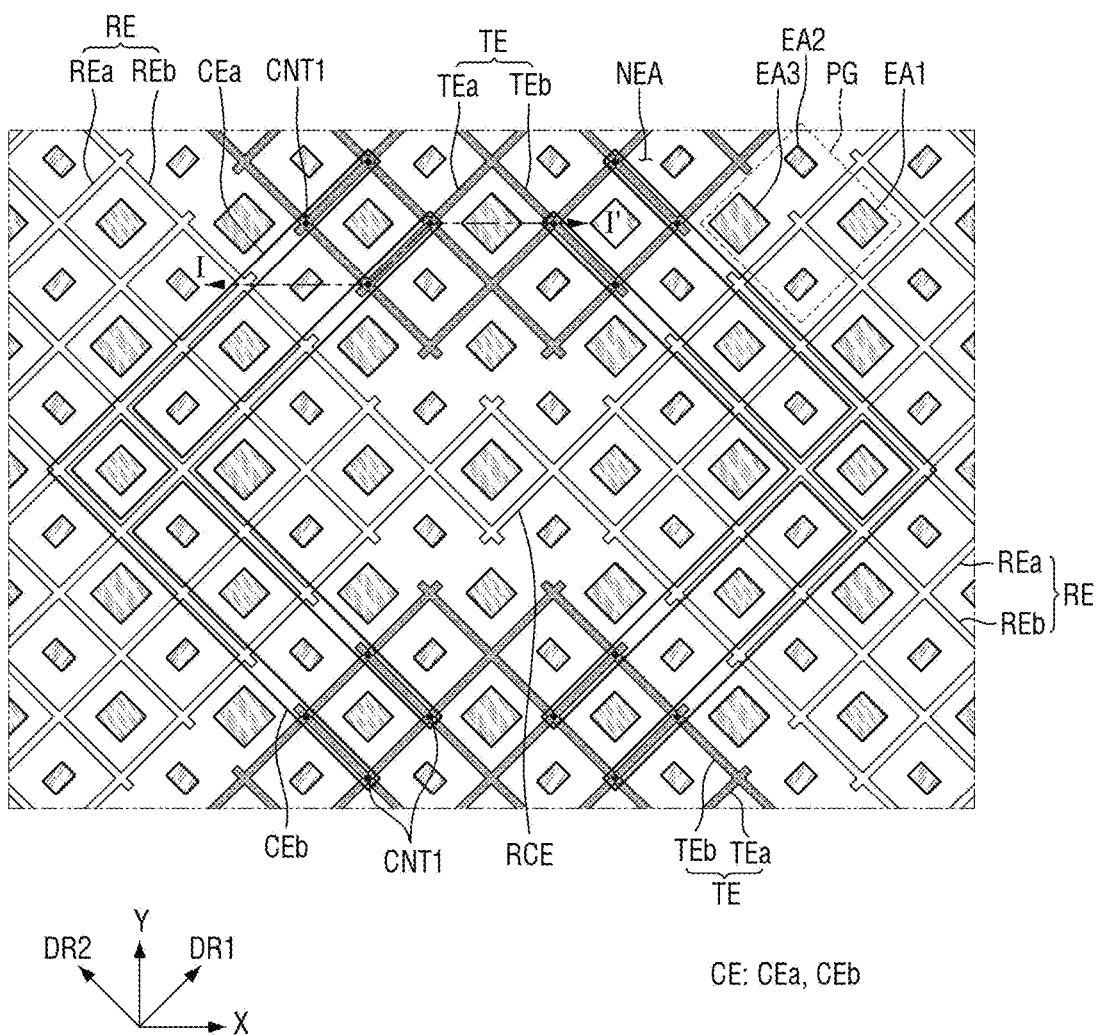
FIG. 7 is an enlarged view illustrating a portion of the display device according to an embodiment.

FIG. 6 is an enlarged view of area A1 of FIG. 5. FIG. 7 is an enlarged view illustrating a portion of the display device according to an embodiment.

Referring to FIGS. 6 and 7, the plurality of driving electrodes TE, the plurality of sensing electrodes RE, and a plurality of dummy electrodes DME (see FIG. 5) may be disposed at the same layer and may be spaced apart from each other.

The plurality of driving electrodes TE may be arranged in the first direction X and the second direction Y. The plurality of driving electrodes TE may be spaced apart from each other in the first direction X and the second direction Y. The driving electrodes TE adjacent to each other in the second direction Y may be electrically connected to each other through the bridge electrode CE.

The plurality of sensing electrodes RE may extend in the first direction X and may be spaced apart from each other in the second direction Y. The plurality of sensing electrodes RE may be arranged in the first direction X and the second direction Y, and the sensing electrodes RE adjacent to each other in the first direction X may be electrically connected to each other through a connection part RCE. For example, the connection part RCE of the sensing electrodes RE may be disposed within the shortest distance between the driving electrodes TE adjacent to each other.

A plurality of bridge electrodes CE may be disposed at a different layer from the driving electrodes TE and the sensing electrodes RE. The bridge electrode CE may include a first portion CEa and a second portion CEb. For example, the second portion CEb of the bridge electrode CE may be connected to the driving electrode TE disposed on one side through a first contact hole CNT1 and may extend in the other direction DR2. The first portion CEa of the bridge electrode CE may be bent from the second portion CEb in an area overlapping the sensing electrode RE, may extend in one direction DR1, and may be connected to the driving electrode TE disposed on the other side through a first contact hole CNT1. Hereinafter, one direction DR1 may be a direction between the first direction X and the second direction Y, and the other direction DR2 may be a direction crossing the one direction DR1. Accordingly, each of the plurality of bridge electrodes CE may connect the driving electrodes TE adjacent to each other in the second direction Y to each other.

As an example, the plurality of driving electrodes TE, the plurality of sensing electrodes RE, and the plurality of dummy electrodes DME (see FIG. 5) may be formed in a mesh structure or a net structure in a plan view. Accordingly, the plurality of driving electrodes TE, the plurality of sensing electrodes RE, and the plurality of dummy electrodes DME (see FIG. 5) may not overlap first to third emission areas EA1, EA2, and EA3 of the pixel SP. The plurality of bridge electrodes CE may also not overlap the first to third emission areas EA1, EA2, and EA3. Accordingly, the display device 10 may prevent luminance of light emitted from the first to third emission areas EA1, EA2, and EA3 from being decreased by the touch unit TSU.

Each of the plurality of driving electrodes TE may include a first portion TEa extending in one direction DR1 and a second portion TEb extending in the other direction DR2. Each of the plurality of sensing electrodes RE may include a first portion REa extending in one direction DR1 and a second portion REb extending in the other direction DR2.

As another example, the plurality of driving electrodes TE, the plurality of sensing electrodes RE, and the plurality of dummy electrodes DME (see FIG. 5) may be formed in an entire surface structure rather than a mesh structure or a net structure in a plan view. In this case, the plurality of driving electrodes TE, the plurality of sensing electrodes RE, and the plurality of dummy electrodes DME (see FIG. 5) may include a transparent conductive material having high light transmittance, such as indium tin oxide (ITO) and indium zinc oxide (IZO), and may prevent luminance of the light emitted from the first to third emission areas EA1, EA2, and EA3 from being decreased.

The plurality of pixels may include first to third sub-pixels, and each of the first to third sub-pixels may include first to third emission areas EA1, EA2, and EA3. For example, the first emission area EA1 may emit light of a first color or red light, the second emission area EA2 may emit light of a second color or green light, and the third emission area EA3 may emit light of a third color or blue light, but the present disclosure is not limited thereto.

One pixel SP may include one first emission area EA1, two second emission areas EA2, and one third emission area EA3 to express a white gradation. Accordingly, a white gradation may be expressed by a combination of light emitted from one first emission area EA1, light emitted from two second emission areas EA2, and light emitted from one third emission area EA3.

Figure 8:
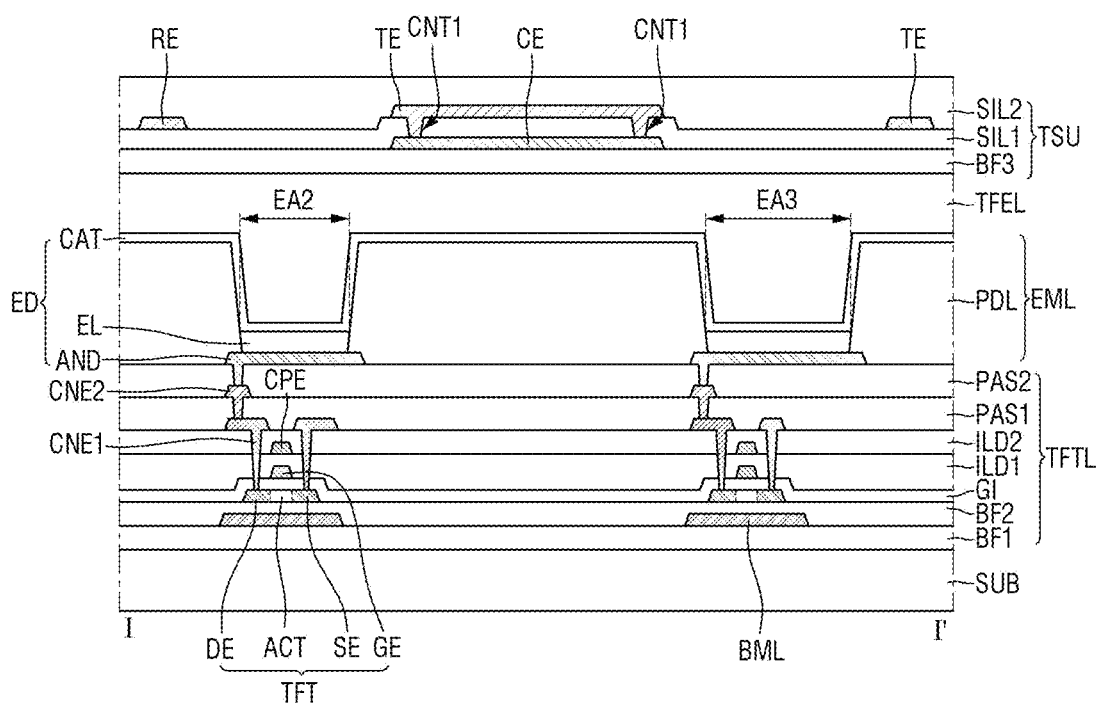
FIG. 8 is a cross-sectional view taken along line I-I' of FIG. 7.

FIG. 8 is a cross-sectional view taken along line I-I' of FIG. 7.

Referring to FIG. 8, the display panel 100 may include a display unit DU and a touch unit TSU. The display unit DU may include a substrate SUB, a thin film transistor layer TFTL, a light emitting element layer EML, and an encapsulation layer TFEL.

The substrate SUB may support the display panel 100. The substrate SUB may be a base substrate or a base member, and may be made of an insulating material such as a polymer resin. As an example, the substrate SUB may be a flexible substrate that may be bent, folded, or rolled. As another example, the substrate SUB may include a flexible material and a rigid material.

The thin film transistor layer TFTL may include first and second buffer layers BF1 and BF2, thin film transistors TFT, a gate insulating film GI, a first interlayer insulating film ILD1, capacitor electrodes CPE, a second interlayer insulating film ILD2, first connection electrodes CNE1, a first passivation layer PAS1, second connection electrodes CNE2, and a second passivation layer PAS2.

The first buffer layer BF1 may be disposed on the substrate SUB. The first buffer layer BF1 may include an inorganic film capable of preventing penetration of air or moisture. For example, the first buffer layer BF1 may include a plurality of inorganic films that are alternately stacked.

A light blocking layer BML may be disposed on the first buffer layer BF1. As an example, the light blocking layer BML may be formed as a single layer or multiple layers made of any one of molybdenum (Mo), aluminum (Al), chromium (Cr), gold (Au), titanium (Ti), nickel (Ni), neodymium (Nd), and copper (Cu), or alloys thereof. As another example, the light blocking layer BML may be an organic film including a black pigment.

The second buffer layer BF2 may cover the first buffer layer BF1 and the light blocking layer BML. The second buffer layer BF2 may include an inorganic film capable of preventing penetration of air or moisture. For example, the second buffer layer BF2 may include a plurality of inorganic films that are alternately stacked.

The thin film transistor TFT may be disposed on the second buffer layer BF2, and may be part of a pixel circuit of each of the plurality of pixels. For example, the thin film transistor TFT may be a driving transistor or a switching transistor of the pixel circuit. The thin film transistor TFT may include a semiconductor region ACT, a gate electrode GE, a source electrode SE, and a drain electrode DE.

The semiconductor region ACT, the source electrode SE, and the drain electrode DE may be disposed on the second buffer layer BF2. The semiconductor region ACT may overlap the gate electrode GE in the thickness direction, and may be insulated from the gate electrode GE by the gate insulating film GI. The source electrode SE and the drain electrode DE may be provided by making a material of the semiconductor region ACT conductive.

The gate electrode GE may be disposed on the gate insulating film GI. The gate electrode GE may overlap the semiconductor region ACT with the gate insulating film GI interposed therebetween.

The gate insulating film GI may be provided on the semiconductor region ACT, the source electrode SE, and the drain electrode DE. For example, the gate insulating film GI may cover the semiconductor region ACT, the source electrode SE, the drain electrode DE, and the second buffer layer BF2, and may insulate the semiconductor region ACT and the gate electrode GE from each other. The gate insulating film GI may include a contact hole through which the first connection electrode CNE1 penetrates.

The first interlayer insulating film ILD1 may cover the gate electrode GE and the gate insulating film GI. The first interlayer insulating film ILD1 may include a contact hole through which the first connection electrode CNE1 penetrates. The contact hole of the first interlayer insulating film ILD1 may be connected to the contact hole of the gate insulating film GI and a contact hole of the second interlayer insulating film ILD2.

The capacitor electrode CPE may be disposed on the first interlayer insulating film ILD1. The capacitor electrode CPE may overlap the gate electrode GE in the third direction (Z-axis direction).

The second interlayer insulating film ILD2 may cover the capacitor electrode CPE and the first interlayer insulating film ILD1. The second interlayer insulating film ILD2 may include a contact hole through which the first connection electrode CNE1 penetrates. The contact hole of the second interlayer insulating film ILD2 may be connected to the contact hole of the first interlayer insulating film ILD1 and the contact hole of the gate insulating film GI.

The first connection electrode CNE1 may be disposed on the second interlayer insulating film ILD2. The first connection electrode CNE1 may connect the drain electrode DE of the thin film transistor TFT and the second connection electrode CNE2 to each other. The first connection electrode CNE1 may be inserted into the contact holes provided in the second interlayer insulating film ILD2, the first interlayer insulating film ILD1, and the gate insulating film GI to be in contact with the drain electrode DE of the thin film transistor TFT.

The first passivation layer PAS1 may cover the first connection electrode CNE1 and the second interlayer insulating film ILD2. The first passivation layer PAS1 may protect the thin film transistor TFT. The first passivation layer PAS1 may include a contact hole through which the second connection electrode CNE2 penetrates.

The second connection electrode CNE2 may be disposed on the first passivation layer PAS1. The second connection electrode CNE2 may connect the first connection electrode CNE1 and a first electrode AND of a light emitting element ED to each other. The second connection electrode CNE2 may be inserted into the contact hole provided in the first passivation layer PAS1 to be in contact with the first connection electrode CNE1.

The second passivation layer PAS2 may cover the second connection electrode CNE2 and the first passivation layer PAS1. The second passivation layer PAS2 may include a contact hole through which the first electrode AND of the light emitting element ED penetrates.

The light emitting element layer EML may be disposed on the thin film transistor layer TFTL. The light emitting element layer EML may include light emitting elements ED and a pixel defining film PDL. The light emitting element ED may include the first electrode AND, an emission layer EML, and a second electrode CAT.

The first electrode AND may be disposed on the second passivation layer PAS2. The first electrode AND may be disposed to overlap one of the first to third emission areas EA1, EA2, and EA3 defined by the pixel defining film PDL. The first electrode AND may be connected to the drain electrode DE of the thin film transistor TFT through the first and second connection electrodes CNE1 and CNE2.

The light emitting layer EL may be disposed on the first electrode AND. For example, the light emitting layer EL may be an organic light emitting layer made of an organic material, but is not limited thereto. In a case where the light emitting layer EL is the organic light emitting layer, when the thin film transistor TFT applies a predetermined voltage to the first electrode AND of the light emitting element ED and the second electrode CAT of the light emitting element ED receives a common voltage or a cathode voltage, holes and electrons may move to the light emitting layer EL through a hole transport layer and an electron transport layer, respectively, and may be combined with each other in the light emitting layer EL to emit light.

The second electrode CAT may be disposed on the light emitting layer EL. For example, the second electrode CAT is not divided for each of the plurality of pixels, and may be implemented in the form of an electrode common to all the pixels. For example, the second electrode CAT may be disposed on the light emitting layers EL in the first to third emission areas EA1, EA2, and EA3, and may be disposed on the pixel defining film PDL in an area other than the first to third emission areas EA1, EA2, and EA3.

The pixel defining film PDL may define the first to third emission areas EA1, EA2, and EA3. The pixel defining film PDL may insulate the first electrodes AND of a plurality of light emitting elements ED from each other. The first electrodes AND of a plurality of light emitting elements ED may be spaced apart from each other by the pixel defining film PDL.

The encapsulation layer TFEL may be disposed on the second electrode CAT to cover the plurality of light emitting elements ED. The encapsulation layer TFEL may include at least one inorganic film to prevent oxygen or moisture from permeating into the light emitting element layer EML. The encapsulation layer TFE may include at least one organic film to protect the light emitting element layer EML from foreign substances such as dust.

The touch unit TSU may be disposed on the encapsulation layer TFEL. The touch unit TSU may include a third buffer layer BF3, bridge electrodes CE, a first insulating layer SIL1, driving electrodes TE, sensing electrodes RE, and a second insulating layer SIL2.

The third buffer layer BF3 may be disposed on the encapsulation layer TFEL. The third buffer layer BF3 may have insulating and optical functions. The third buffer layer BF3 may include at least one inorganic film. Optionally, the third buffer layer BF3 may be omitted. When the third buffer layer BF3 is omitted, the first insulating layer SIL1 may contact the encapsulation layer TFEL.

The bridge electrode CE may be disposed on the third buffer layer BF3. The bridge electrode CE may be disposed at a different layer from the driving electrode TE and the sensing electrode RE, and may connect the driving electrodes TE adjacent to each other in the second direction Y to each other. For example, the bridge electrode CE may be formed as a single layer made of molybdenum (Mo), titanium (Ti), copper (Cu), or aluminum (Al) or be formed as a stacked structure (Ti/Al/Ti) of aluminum and titanium, a stacked structure (ITO/Al/ITO) of aluminum and ITO, an APC alloy, and a stacked structure (ITO/APC/ITO) of an APC alloy and ITO.

The first insulating layer SIL1 may cover the bridge electrode CE and the third buffer layer BF3. The first insulating layer SIL1 may have insulating and optical functions. The first insulating layer SIL1 may be formed as an inorganic film, for example, a silicon nitride layer, a silicon oxynitride layer, a silicon oxide layer, a titanium oxide layer, or an aluminum oxide layer.

The driving electrode TE and the sensing electrode RE may be disposed on the first insulating layer SILL Each of the driving electrode TE and the sensing electrode RE may not overlap the first to third emission areas EA1, EA2, and EA3. Each of the driving electrode TE and the sensing electrode RE may be formed as a single layer made of molybdenum (Mo), titanium (Ti), copper (Cu), or aluminum (Al) or be formed as a stacked structure (Ti/Al/Ti) of aluminum and titanium, a stacked structure (ITO/Al/ITO) of aluminum and ITO, an APC alloy, and a stacked structure (ITO/APC/ITO) of an APC alloy and ITO.

The second insulating layer SIL2 may cover the driving electrode TE, the sensing electrode RE, and the first insulating layer SILL The second insulating layer SIL2 may have insulating and optical functions. The second insulating layer SIL2 may be made of the same material or material similar to the material of the first insulating layer SILL FIG. 9 is a block diagram illustrating the touch driving unit of the display device according to an embodiment.

Figure 9:
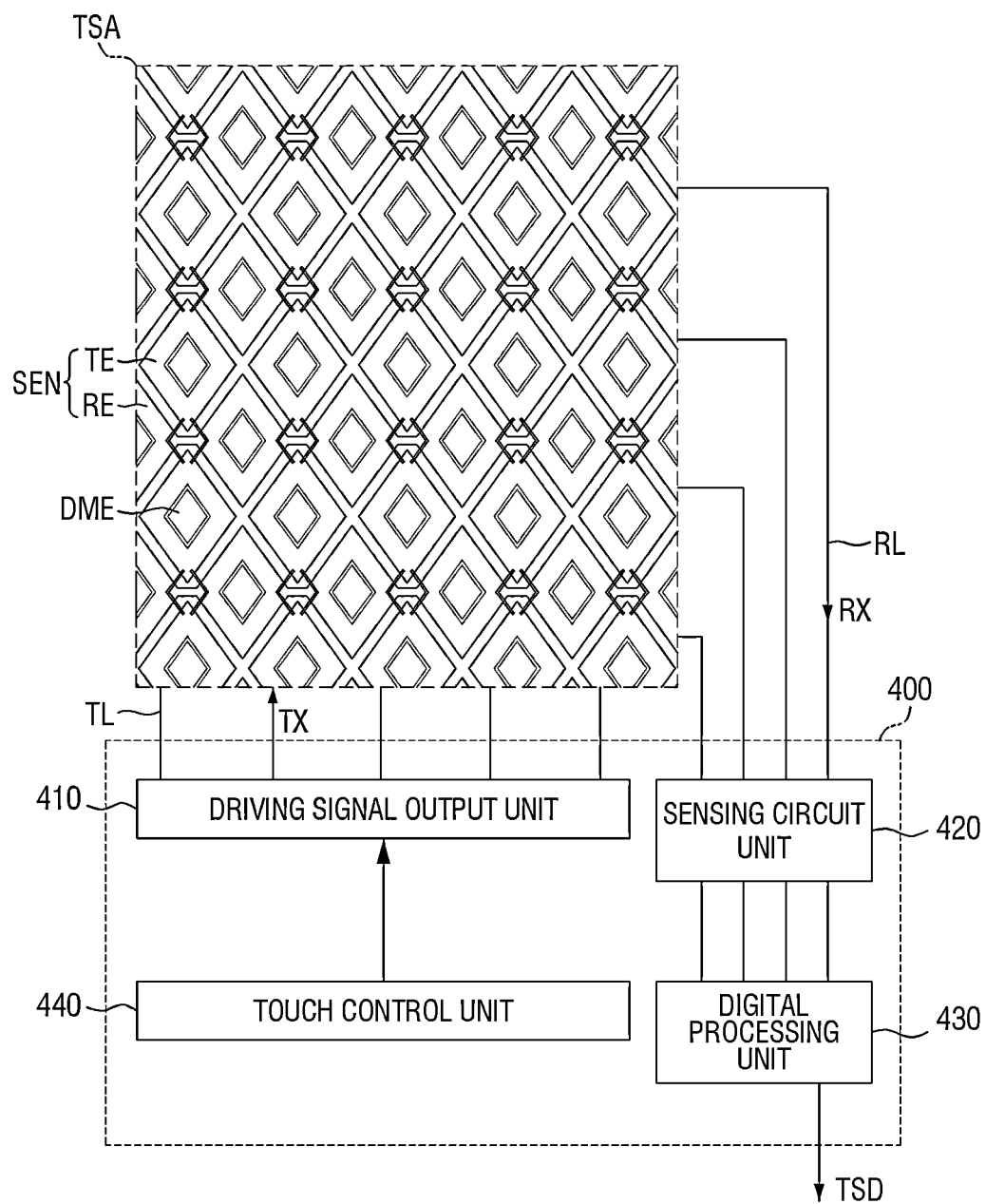
FIG. 9 is a block diagram illustrating the touch driving unit of the display device according to an embodiment.

Referring to FIG. 9, the touch driving unit 400 may include a driving signal output unit 410 (e.g., an output circuit), a sensing circuit unit 420 (e.g., a sensing circuit), a digital processing unit 430 (e.g., a digital signal processor, an analog to digital converter, etc.), and a touch control unit 440 (e.g., a control circuit).

The driving signal output unit 410 may be connected to the plurality of driving electrodes TE through the touch driving lines TL. The driving signal output unit 410 may supply touch driving signals to the plurality of driving electrodes TE. The touch driving signal may be a signal having a plurality of driving pulses. The driving signal output unit 410 may supply the touch driving signals to the touch driving lines TL based on a preset order. For example, the driving signal output unit 410 may sequentially output the touch driving signals from the driving electrode TE disposed on one side of the touch area TSA to the driving electrode TE disposed on the other side of the touch area TSA.

The sensing circuit unit 420 may be connected to the plurality of sensing electrodes RE through the touch sensing lines RL. The sensing circuit unit 420 may sense change amounts in mutual capacitance between the plurality of driving electrodes TE and the plurality of sensing electrodes RE through the touch sensing lines RL. For example, the sensing circuit unit 420 may include an integrating circuit including at least one operational amplifier for sensing a change in capacitance from the sensing electrode RE of the touch unit TSU and a capacitor having a predetermined capacitance. An inverting input terminal of the operational amplifier may be connected to the sensing electrode RE to output the change in capacitance as an analog signal.

The sensing circuit unit 420 may include a capacitor, a switch, a resistor, an amplifier, and a sample and holder, but an implementation form of the sensing circuit unit 420 is not limited thereto. For example, a voltage corresponding to electric charges charged in the capacitor may be sampled and then held for a predetermined period by the sample and holder.

As another example, the driving signal output unit 410 may supply the touch driving signals to the plurality of driving electrodes TE, and the sensing circuit unit 420 may supply the touch driving signals to the plurality of sensing electrodes RE. In this case, the driving signal output unit 410 may sense change amounts in electric charges of the plurality of driving electrodes TE, and the sensing circuit unit 420 may sense change amounts in electric charges of the plurality of sensing electrodes RE. Accordingly, each of the driving signal output unit 410 and the sensing circuit unit 420 may sense change amounts in self-capacitance formed in the plurality of driving electrodes TE and the plurality of sensing electrodes RE.

The sensing circuit unit 420 may receive touch signals RX through the touch sensing lines RL. The touch signal RX may be an analog signal having a plurality of driving pulses. The touch signal RX may be a sine wave, a pulse wave, or a ramp wave having any frequency (or cycle), but is not limited thereto. The sensing circuit unit 420 may output the touch signal RX including the analog signal to the digital processing unit 430.

The digital processing unit 430 may receive the touch signal RX from the sensing circuit unit 420. The digital processing unit 430 may convert the touch signal RX including the analog signal into second touch sensing data TDS2, which is digital data.

When a sensed voltage of the touch signal RX is greater than a predetermined value, the digital processing unit 430 may decide that a touch has been input. Specifically, the touch signal RX may have a capacitance change as an analog waveform. The digital processing unit 430 may generate the second touch sensing data TDS2 by calculating an amplitude and a phase of the touch signal RX and converting the analog signal into a digital signal. In addition, the digital processing unit 430 may generate touch data TSD based on the second touch sensing data TDS2. This will be described later with reference to FIGS. 10 and 11.

The touch control unit 440 may control a driving timing of the driving signal output unit 410. The touch control unit 440 may output a timing signal for controlling the driving timing of the driving signal output unit 410 to the driving signal output unit 410. In addition, the touch control unit 440 may control a driving timing for synchronization between the driving signal output unit 410, the sensing circuit unit 420, and the digital processing unit 430.

Figure 10:
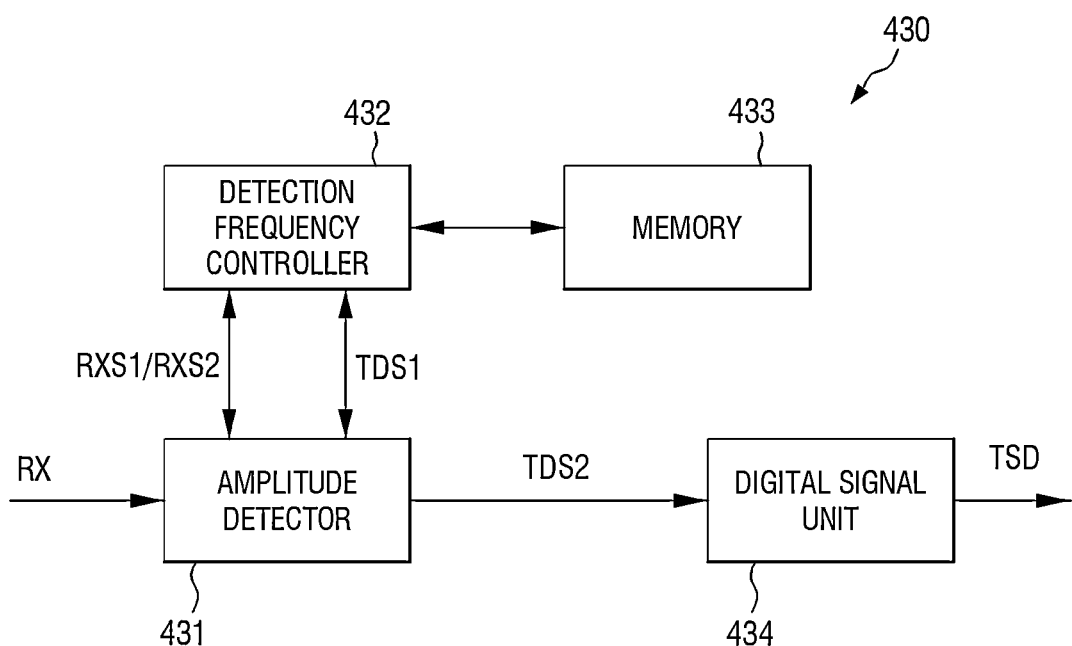
FIG. 10 is a block diagram illustrating a digital processing unit of the display device according to an embodiment.

FIG. 10 is a block diagram illustrating a digital processing unit of the display device according to an embodiment.

Referring to FIG. 10, the digital processing unit 430 includes an amplitude detector 431 (e.g., a detector circuit), a detection frequency controller 432 (e.g., a controller circuit), a memory 433, and a digital signal unit 434 (e.g., a digital signal processor).

The amplitude detector 431 may receive the touch signal RX from the sensing circuit unit 420 and receive a first touch sensing signal RXS1 from the detection frequency controller 432. The amplitude detector 431 may sense magnitudes or amplitudes of the received touch signal RX (e.g., sensed voltages of the touch signal RX) according to the first touch sensing signal RXS1. Specifically, the amplitude detector 431 may sense the touch signal RX at a cycle different from that of the touch signal RX. In this case, phases of sensed points may be different from each other. In an embodiment, the amplitude detector 431 detects different sensed voltages of the touch signal RX by sensing the touch signal RX at a cycle of the first touch sensing signal RXS1 different from the cycle of the touch signal RX.

The amplitude detector 431 may generate first touch sensing data TDS1 including information on the sensed voltages of the touch signal RX. The amplitude detector 431 may output the first touch sensing data TDS1 to the detection frequency controller 432.

In addition, the amplitude detector 431 may receive a second touch sensing signal RXS2 from the detection frequency controller 432. The amplitude detector 431 may sense an amplitude or a maximum sensed voltage VM of the received touch signal RX according to the second touch sensing signal RXS2. Specifically, the amplitude detector 431 may sense the touch signal RX at the same cycle as the touch signal RX. Accordingly, the amplitude detector 431 may generate the second touch sensing data TDS2 having information on the touch input. The amplitude detector 431 may output the second touch sensing data TDS2 to the digital signal unit 434.

The detection frequency controller 432 may receive the first touch sensing data TDS1 from the amplitude detector 431. The first touch sensing data TDS1 may include information on phases of the touch signal RX. Accordingly, the detection frequency controller 432 may detect a maximum value of the first touch sensing data TDS1 of the touch signal RX as the amplitude of the touch signal RX. The detection frequency controller 432 may calculate an interval of a point having the maximum value of the first touch sensing data TDS1 as a phase delay amount.

The detection frequency controller 432 may change a sensing timing of the second touch sensing signal RXS2 based on the calculated phase delay amount of the touch signal RX. That is, the detection frequency controller 432 may change a phase of the second touch sensing signal RXS2. The detection frequency controller 432 may output the second touch sensing signal RXS2 to the amplitude detector 431. This will be described later with reference to FIGS. 13 to 16.

The memory 433 may store information for the detection frequency controller 432 to calculate the phase delay amount. The memory 433 may store information on frequencies or cycles of the first touch sensing signal RXS1 and the second touch sensing signal RXS2 output by the detection frequency controller 432. In addition, the memory 433 may store information on frequencies or cycles of the touch signal RX and the touch driving signal TX. The memory 433 may store information on a sensing timing of the first touch sensing signal RXS1. For example, the memory 433 may store information on preset intervals of the touch signal RX and the first touch sensing signal RXS1 (e.g., data values in the form of a lookup table stored in the memory 433).

The digital signal unit 434 receives the second touch sensing data TDS2 from the amplitude detector 431. The digital signal unit 434 may generate touch data in the form of a digital signal based on the second touch sensing data TDS2.

Figure 11:
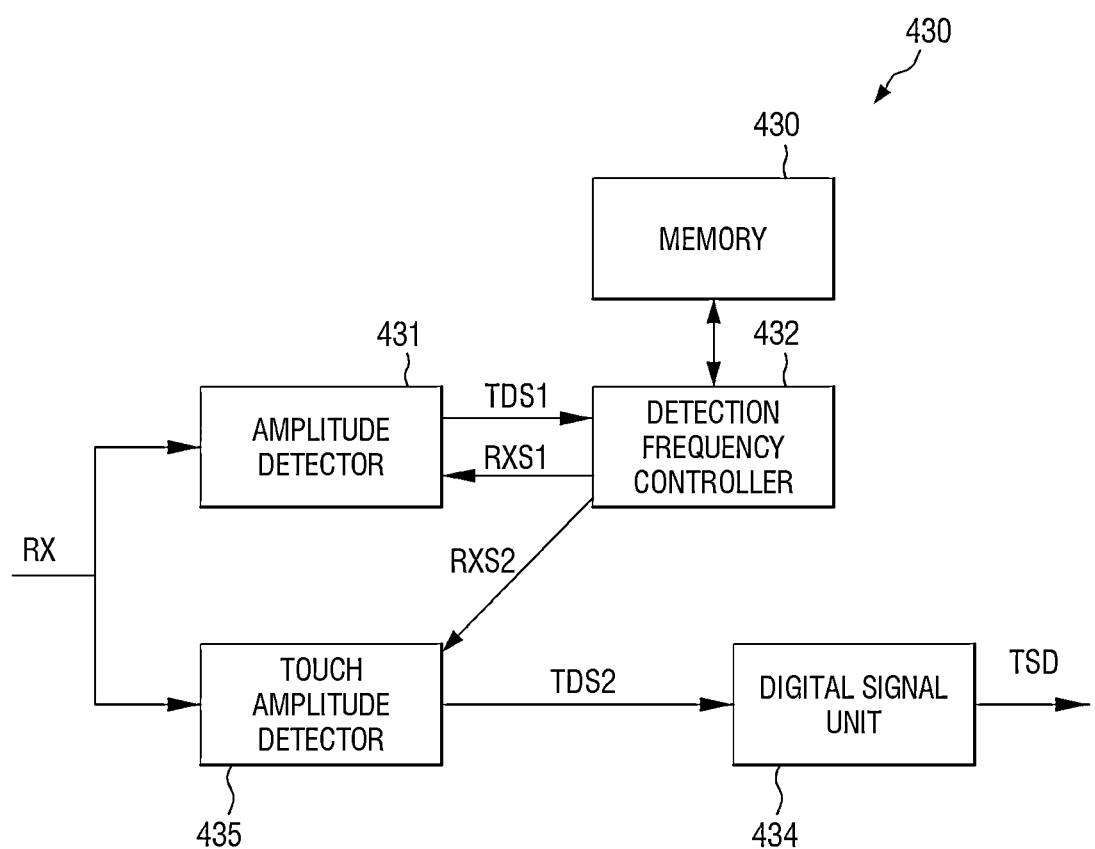
FIG. 11 is a block diagram illustrating a digital processing unit of the display device according to an embodiment.

FIG. 11 is a block diagram illustrating a digital processing unit of the display device according to an embodiment.

An embodiment of FIG. 11 is substantially the same as an embodiment of FIG. 10 except that a touch amplitude detector 435 (e.g., detector circuit) is added, and thus, contents different from those of an embodiment of FIG. 10 will be mainly described.

Referring to FIG. 11, the digital processing unit 430 includes an amplitude detector 431, a detection frequency controller 432, a memory 433, a digital signal unit 434, and a touch amplitude detector 435.

The amplitude detector 431 may receive the touch signal RX from the sensing circuit unit 420 and receive a first touch sensing signal RXS1 from the detection frequency controller 432. The amplitude detector 431 may sense magnitudes or amplitudes of the received touch signal RX (e.g., sensed voltages of the touch signal RX) according to the first touch sensing signal RXS1. Specifically, the amplitude detector 431 may sense the touch signal RX at a cycle different from that of the touch signal RX. In this case, phases of sensed points may be different from each other. Accordingly, the amplitude detector 431 may detect different sensed voltages of the touch signal RX by sensing the touch signal RX at a cycle of the first touch sensing signal RXS1 different from the cycle of the touch signal RX.

The amplitude detector 431 may generate first touch sensing data TDS1 including information on the sensed voltages of the touch signal RX. The amplitude detector 431 may output the first touch sensing data TDS1 to the detection frequency controller 432.

The detection frequency controller 432 may receive the first touch sensing data TDS1 from the amplitude detector 431. The first touch sensing data TDS1 may include information on phases of the touch signal RX. Accordingly, the detection frequency controller 432 may detect a maximum value of the first touch sensing data TDS1 of the touch signal RX as the amplitude of the touch signal RX. The detection frequency controller 432 may calculate an interval of a point having the maximum value of the first touch sensing data TDS1 as a phase delay amount.

The detection frequency controller 432 may change a sensing timing of a second touch sensing signal RXS2 based on the calculated phase delay amount of the touch signal RX. That is, the detection frequency controller 432 may change a phase of the second touch sensing signal RXS2. The detection frequency controller 432 may output the second touch sensing signal RXS2 to the touch amplitude detector 435.

The touch amplitude detector 435 may receive the second touch sensing signal RXS2 from the detection frequency controller 432. The touch amplitude detector 435 may sense an amplitude or a maximum sensed voltage VM of the received touch signal RX according to the second touch sensing signal RXS2. Specifically, the touch amplitude detector 435 may sense the touch signal RX at the same cycle as the touch signal RX. Accordingly, the touch amplitude detector 435 may generate the second touch sensing data TDS2 having information on the touch input. The touch amplitude detector 435 may output the second touch sensing data TDS2 to the digital signal unit 434.

The digital signal unit 434 receives the second touch sensing data TDS2 from the touch amplitude detector 435. The digital signal unit 434 may generate touch data in the form of a digital signal based on the second touch sensing data TDS2.

Also in the present embodiment, the digital processing unit 430 may calculate the phase delay amount of the touch signal RX and delay the phase of the second touch sensing data TDS2, and accordingly, may generate the touch data. That is, the digital processing unit 430 may generate the touch data, which is a digital signal, by calculating the amplitude of the touch signal RX.

Figure 12:
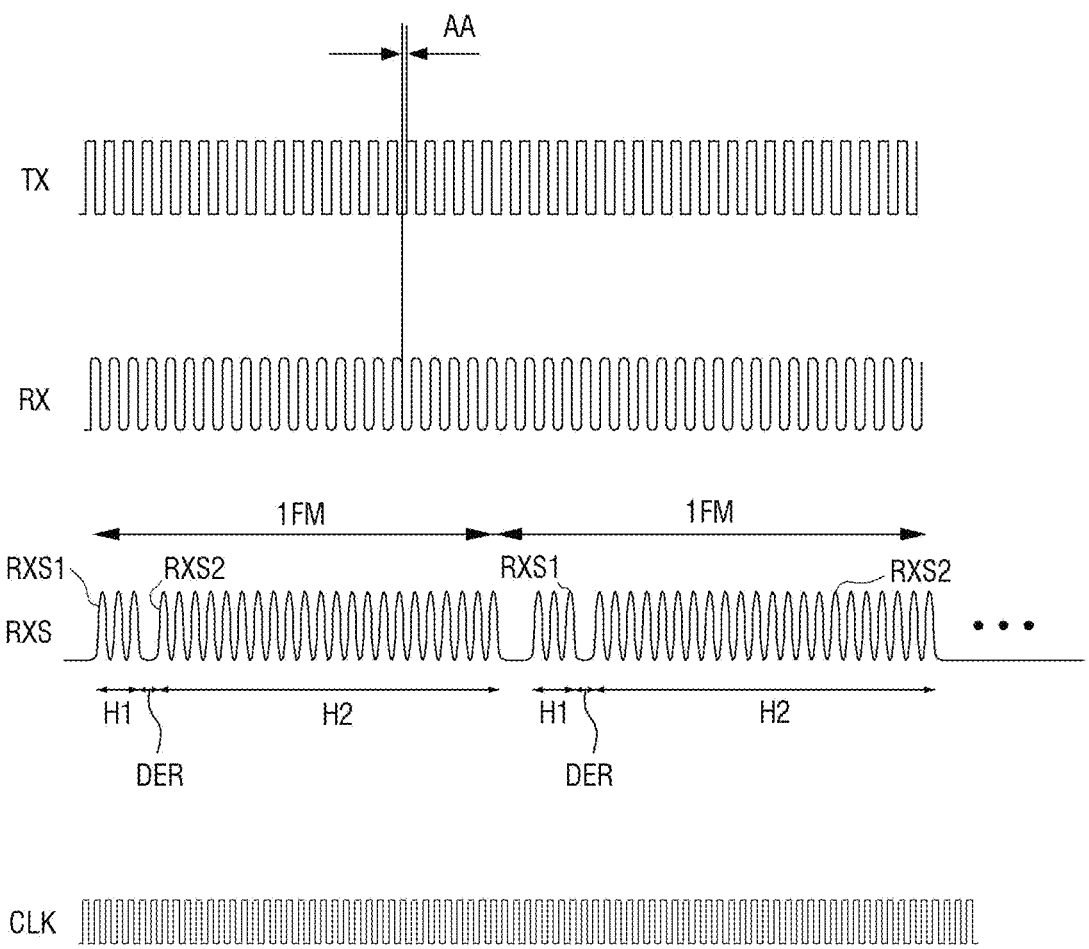
FIG. 12 is a timing diagram illustrating a touch driving signal, a touch signal, a touch sensing signal, and a clock signal of the display device according to an embodiment.

FIG. 12 is a timing diagram illustrating a touch driving signal TX, a touch signal, a touch sensing signal RX, and a clock signal of the display device according to an embodiment.

Referring to FIG. 12, the touch driving unit 400 may drive the touch unit TSU at any driving frequency. The touch driving signal TX may repeatedly have high levels and low levels during one frame period 1FM. The touch driving signal TX may have one low level during one cycle. One cycle of the touch driving signal TX may be a first cycle T1. The touch driving signal TX may be a signal having a plurality of driving pulses. The touch driving signal TX may be a sine wave, a pulse wave, or a ramp wave having a predetermined frequency, but is not limited thereto.

The touch driving unit 400 may supply the touch driving signal TX having the same phase to each of the plurality of touch driving lines TL during a plurality of consecutive frame periods. For example, phases of the respective touch driving signals TX supplied in a first frame period 1FM may be the same as each other.

The touch driving unit 400 may receive the touch signal RX through a sensing line. The touch signal RX may repeatedly have high levels and low levels during one frame period 1FM. The touch signal RX may have one low level during one cycle. One cycle of the touch signal RX may be a first cycle Ti. That is, a cycle of the touch signal RX may be substantially the same as the first cycle Ti of the touch driving signal TX. The touch signal RX may be a signal having a plurality of pulses having an analog waveform. The touch signal RX may be a sine wave having a predetermined frequency, but is not limited thereto.

A phase of the touch signal RX may be different from a phase of the touch driving signal TX. For example, as a mutual capacitance is sensed according to the touch driving signal TX, the phase of the touch signal RX may be delayed from the phase of the touch driving signal TX. In summary, the phase of the touch signal RX may be delayed from the phase of the touch driving signal TX by a phase delay amount AA or by a phase offset amount.

The touch driving unit 400 may sense the touch signal RX based on the touch sensing signal RXS. That is, the touch driving unit 400 may sense the touch signal RX at any cycle or frequency based on a cycle of the touch sensing signal RXS.

The touch sensing signal RXS may include a first touch sensing section H1, a phase shift section DER, and a second touch sensing section H2.

The touch sensing signal RXS includes a first touch sensing signal RXS1 generated during the first touch sensing section H1 and a second touch sensing signal RXS2 generated during the second touch sensing section H2. The first touch sensing signal RXS1 and the second touch sensing signal RXS2 may repeatedly have high levels and low levels during one frame period 1FM. Each of the first touch sensing signal RXS1 and the second touch sensing signal RXS2 may have one low level during one cycle. Each of the first touch sensing signal RXS1 and the second touch sensing signal RXS2 may be a sine wave, a pulse wave, or a ramp wave having a predetermined frequency, but is not limited thereto. This will be described later with reference to FIGS. 13 to 16.

In an embodiment, the first touch sensing section H1 is shorter than the second touch sensing section H2. The touch driving unit 400 may detect the sensed voltages of the touch signal RX according to the high levels of the first touch sensing signal RXS1 and the second touch sensing signal RXS2. In an embodiment, the touch driving unit 400 senses the phase of the touch signal during the first touch sensing section H1 and recognizes a user's touch position during the second touch sensing section H2. In an embodiment, the second touch sensing section H2 is relatively longer than the first touch sensing section H1 to more accurately recognize the user's touch position.

In an embodiment, the touch sensing signal RXS has a low level signal during the phase shift section DER. The touch driving unit 400 may delay the phase of the second touch sensing signal RXS2 during the phase shift section DER. For example, the touch driving unit 400 may delay the phase of the second touch sensing signal RXS2 by the phase delay amount AA during the phase shift section DER. This will be described later with reference to FIGS. 13 to 16. For example, touch driving unit 400 may adjust the length of the phase shift section DER based on the phase delay amount AA.

Figure 13:
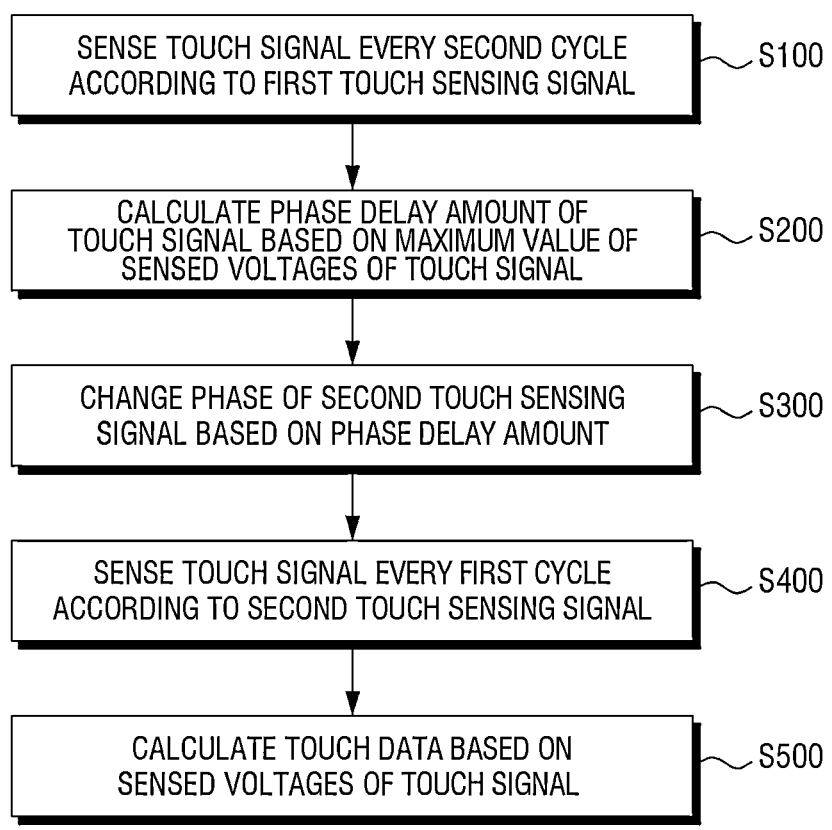
FIG. 13 is a flowchart illustrating processes of calculating touch data of the display device according to an embodiment.
Figure 14:
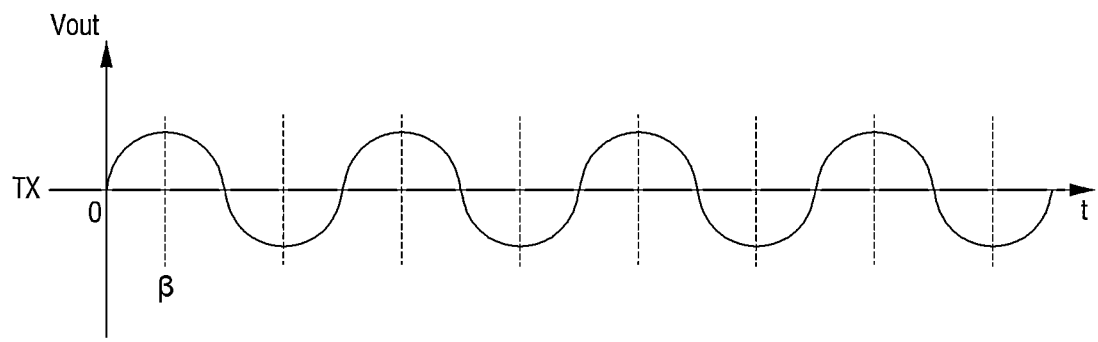
FIG. 14 is a timing diagram illustrating a touch driving signal, a touch signal, and a first touch sensing signal of the display device according to an embodiment.
Figure 14:
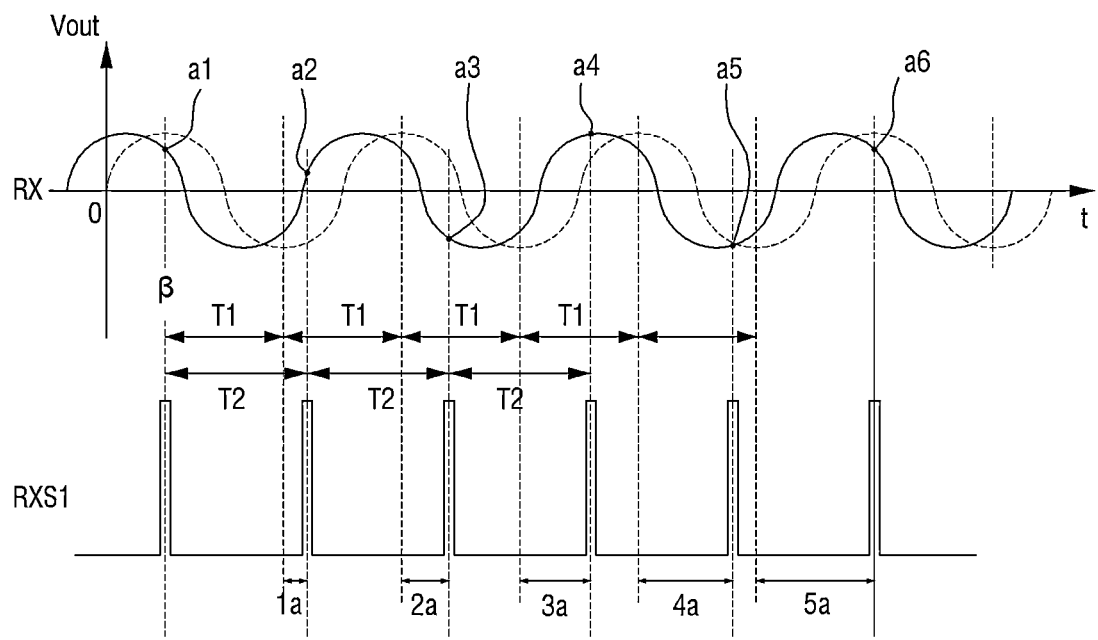
Figure 15:
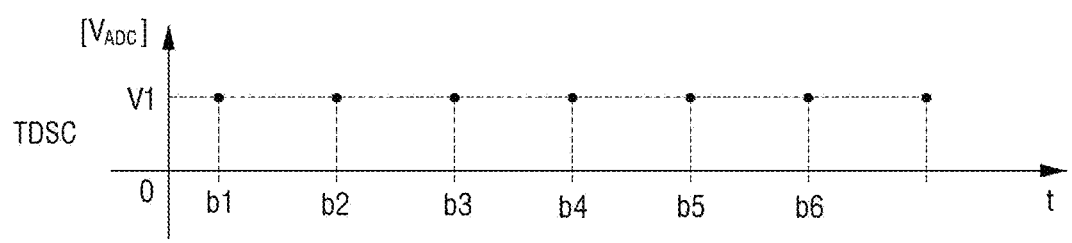
FIG. 15 is a timing diagram illustrating touch sensing data of the display device according to an embodiment.
Figure 15:
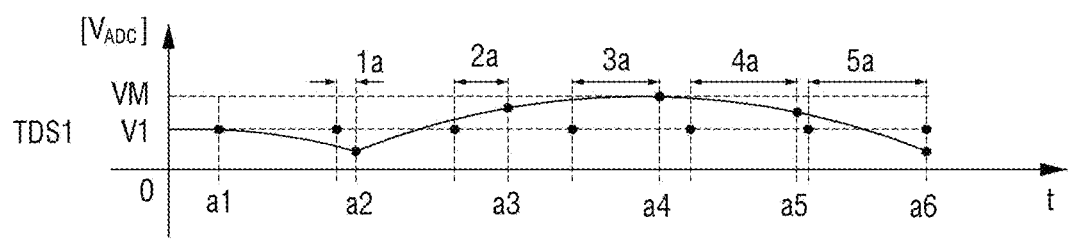
Figure 16:
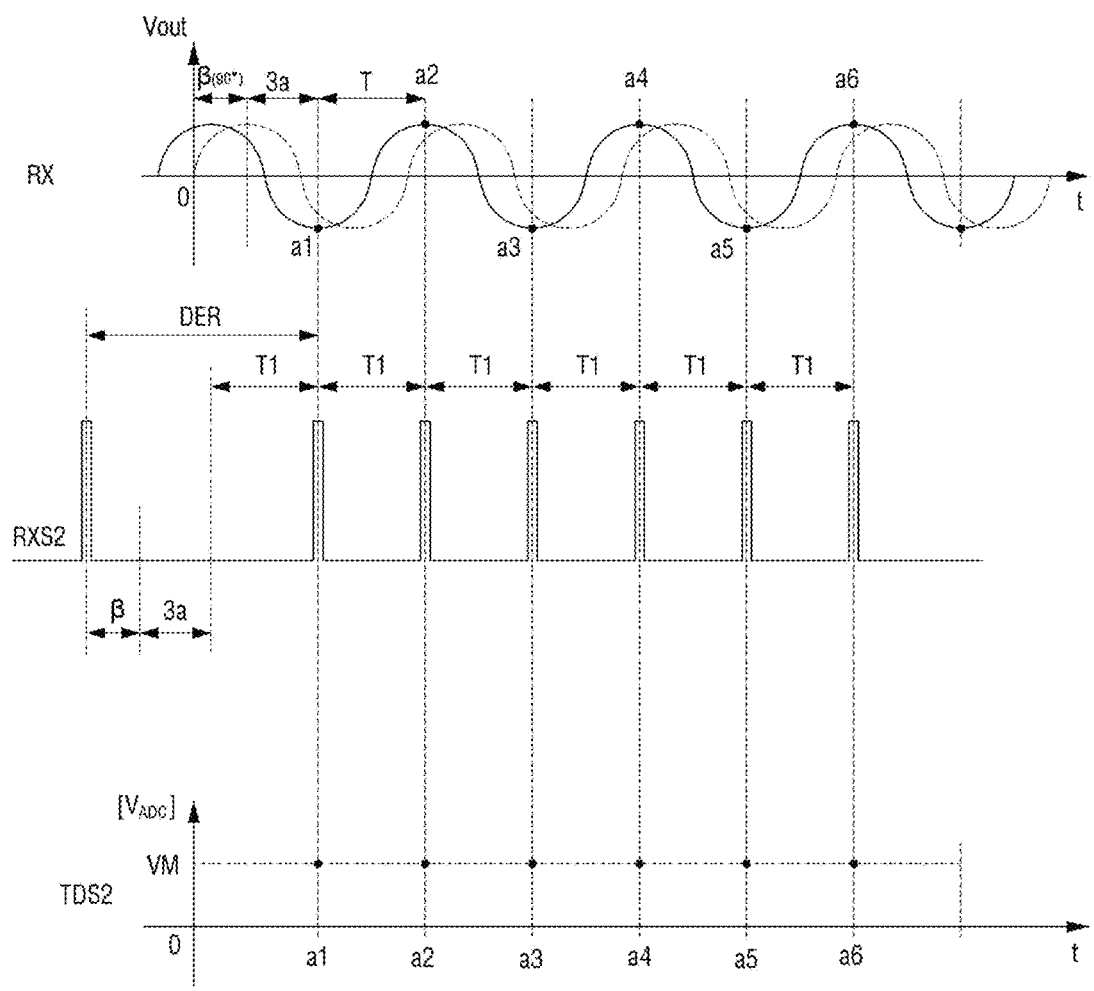
FIG. 16 is a timing diagram illustrating a touch signal, a second touch sensing signal, and second touch sensing data of the display device according to an embodiment.

FIG. 13 is a flowchart illustrating a method of calculating touch data of the display device according to an embodiment. FIG. 14 is a timing diagram illustrating a touch driving signal, a touch signal, and a first touch sensing signal of the display device according to an embodiment. FIG. 15 is a timing diagram illustrating touch sensing data of the display device according to an embodiment. FIG. 16 is a timing diagram illustrating a touch signal, a second touch sensing signal, and second touch sensing data of the display device according to an embodiment.

Hereinafter, a method of calculating touch data by calculating a phase delay amount of the touch signal RX will be described with reference to FIGS. 13 to 16.

Referring to FIG. 13, first, the touch driving unit 400 senses the touch signal RX every second cycle T2 according to the first touch sensing signal RXS1 (S100).

As described above, when a sensed voltage of the touch signal RX is greater than a predetermined value, the touch driving unit 400 may decide that a touch has been input. Specifically, the touch signal RX sensed by the sensing electrode RE may have a capacitance change as an analog waveform. For example, the touch signal RX may have a sine wave shape as illustrated in FIG. 14. The touch driving unit 400 may convert the touch signal RX, which is an analog signal, into a digital signal, and decide whether or not the touch has been input based on the digital signal. In this embodiment, the touch driving unit 400 calculates an amplitude and a phase of the touch signal RX.

Referring further to FIG. 14, the touch driving signal TX may repeatedly have high levels and low levels. The touch driving signal TX may have one low level during one cycle. One cycle of the touch driving signal TX may be a first cycle Ti. The touch driving signal TX may be a signal having a plurality of driving pulses.

The touch signal RX may repeatedly have high levels and low levels during one frame period 1FM. The touch signal RX may have one low level during one cycle. One cycle of the touch signal RX may be a first cycle T1. That is, a cycle of the touch signal RX may be substantially the same as the first cycle T1 of the touch driving signal TX.

As described above, the phase of the touch signal RX may be different from the phase of the touch driving signal TX. For example, as a mutual capacitance is sensed according to the touch driving signal TX, the phase of the touch signal RX may be delayed from the phase of the touch driving signal TX.

The touch driving unit 400 may sense the touch signal RX according to the first touch sensing signal RXS1. For example, the first touch sensing signal RXS1 may have a high level every second cycle T2. Accordingly, the touch driving unit 400 may repeatedly sense the touch signal RX every second cycle T2. In an embodiment, the first cycle Ti is smaller than the second cycle T2 by a first interval 1a.

Accordingly, as described above, the touch signal RX has the first cycle T1, and the first touch sensing signal RXS1 has the second cycle T2. In addition, the first cycle Ti is smaller than the second cycle T2 by the first interval 1a. Accordingly, when the touch driving unit 400 senses the touch signal RX every second cycle T2, phases of sensed points may be different from each other. For example, the touch driving unit 400 may detect sensed voltages by sensing the touch signal RX at each of first to sixth points a1 to a6 every second cycle T2. In this case, phases of the first to sixth points a1 to a6 may be gradually delayed by any value. Specifically, the second point a2 may be a point having a phase delayed from that of the touch signal RX by the first interval 1a. In addition, the third to sixth points a3 to a6 may be points having phases delayed from those of the touch signal RX by second to sixth intervals 2a to 5a, respectively.

In summary, the touch driving unit 400 may detect different phases of the touch signal RX by sensing the touch signal RX at the second cycle T2 of the first touch sensing signal RXS1 different from the first cycle T1 of the touch signal RX.

Next, the touch driving unit 400 calculates a phase delay amount of the touch signal RX based on a maximum value of the sensed voltages of the touch signal RX (S200).

In an embodiment of FIG. 15, reference touch sensing data TDSC indicates sensed voltages of the touch signal RX sensed at the first cycle T1 by the first touch sensing signal RXS1. For example, points b1, b2, b3, b4, b5, and b5 may be points at which the sensed voltages of the touch signal RX were sensed at the first cycle T1. In addition, first touch sensing data TDS1 indicates sensed voltages of the touch signal RX sensed at the second cycle T2 by the first touch sensing signal RXS1.

Referring further to FIG. 15, the touch driving unit 400 may detect the sensed voltages of the touch signal RX according to the second cycle T2 of the first touch sensing signal RXS1. The touch driving unit 400 may generate the first touch sensing data TDS1 based on the detected sensed voltages.

Accordingly, the first touch sensing data TDS1 includes information on the sensed voltages of the touch signal RX. As described above, the touch driving unit 400 may detect the phases of the touch signal RX by sensing the touch signal RX at the second cycle T2 of the first touch sensing signal RXS1 different from the first cycle T1 of the touch signal RX. Accordingly, the first touch sensing data TDS1 may include information on the phases of the touch signal RX. For example, in an embodiment of FIG. 15, a first point a1 of the first touch sensing data TDS1 may have a first sensed voltage V 1. In addition, second to sixth points a2 to a6 of the first touch sensing data TDS1 may have voltages different from the first sensed voltage V 1. The fourth point a4 of the first touch sensing data TDS1 may have a third interval 3a. Here, the first to sixth points a1 to a6 of the first touch sensing data TDS1 may be substantially the same as the first to sixth points a1 to a6 of the touch signal RX.

The touch driving unit 400 may detect a maximum value of the first touch sensing data TDS1 of the touch signal RX as an amplitude of the touch signal RX. The touch driving unit 400 may calculate an interval of a point having the maximum value of the first touch sensing data TDS1 as a phase delay amount. For example, the first touch sensing data TDS1 has a maximum sensed voltage VM at the fourth point. A phase of the fourth point a4 of the first touch sensing data TDS1 may be delayed by the third interval 3a. That is, the touch driving unit 400 may calculate the third interval 3a of the fourth point a4 having the maximum value of the first touch sensing data TDS1 as the phase delay amount AA of the touch signal RX. For example, the third interval 3a may be a difference in time between point a4 and point b4.

The maximum value of the first touch sensing data TDS1 may be substantially the same as the amplitude of the touch signal RX, but is not limited thereto. For example, the maximum value of the first touch sensing data TDS1 may have a value smaller than the amplitude of the touch signal RX, but when the first interval 1a is smaller than the first cycle T1, the maximum value of the first touch sensing data TDS1 may be substantially the same as the amplitude of the touch signal RX.

Meanwhile, the reference touch sensing data TDSC indicates the sensed voltages of the touch signal RX sensed at the first cycle T1 by the first touch sensing signal RXS1. Accordingly, the sensed voltages of the reference touch sensing data TDSC are voltages having the same phases as those of the touch signal RX. For example, first to sixth reference points b1 to b6 of the reference touch sensing data TDSC may have the same first sensed voltage V1. In this case, the sensed voltage of the reference touch sensing data TDSC do not include information on the phases of the touch signal RX.

In summary, the touch driving unit 400 may calculate the interval of the point having the maximum value of the first touch sensing data TDS1 as the phase delay amount. The touch driving unit 400 may calculate the phase delay amount of the touch signal RX based on the first touch sensing data TDS1. In an embodiment, the phase delay amount is calculated based on both the first touch sensing data TDS1 and the reference touch sensing data TDSC.

Next, the touch driving unit 400 changes a phase of the second touch sensing signal RXS2 based on the phase delay amount (S300), and senses the touch signal RX every first cycle T1 according to the second touch sensing signal RXS2 (S400).

Referring further to FIG. 16, the touch driving unit 400 may change a sensing timing of the second touch sensing signal RXS2 during the phase shift section DER based on the phase delay amount of the touch signal RX. For example, when the phase delay amount is the third interval 3a, the touch driving unit 400 may delay a timing at which the second touch sensing signal RXS2 has a high level by the third interval 3a. Accordingly, the touch signal RX may be sensed after the second touch sensing signal RXS2 is delayed from the touch signal RX by the third interval 3a. In addition, the touch driving unit 400 may delay the timing at which the second touch sensing signal RXS2 has the high level by a reference interval. Accordingly, the touch signal RX may be sensed after the second touch sensing signal RXS2 is delayed from the touch signal RX by the reference interval. However, the touch signal RX is not sensed after the second touch sensing signal RXS2 is delayed by the reference interval, and may be sensed after the second touch sensing signal RXS2 is delayed only by the third interval 3a.

The touch driving unit 400 may sense the touch signal RX according to the second touch sensing signal RXS2. For example, the second touch sensing signal RXS2 may have a high level every first cycle T1. Accordingly, the touch driving unit 400 may repeatedly sense the touch signal RX every first cycle Ti. Accordingly, the touch driving unit 400 may drive the high level of the second touch sensing signal RXS2 in synchronization with a maximum value of the touch signal RX. The touch driving unit 400 may delay the phase of the second touch sensing signal RXS2 by the phase delay amount. Accordingly, a difference between the phase of the second touch sensing signal RXS2 and the phase of the first touch sensing signal RXS1 may be the same as the phase delay amount.

Accordingly, as described above, the touch signal RX has the first cycle T1, and the second touch sensing signal RXS2 has the first cycle T1. Accordingly, when the touch driving unit 400 senses the touch signal RX every first cycle Ti, the touch driving unit 400 may sense the amplitude of the touch signal RX. For example, the touch driving unit 400 may detect sensed voltages by sensing the touch signal RX at each of first to sixth points a1 to a6 every first cycle T1. In this case, phases of the first to sixth points a1 to a6 may all be the same as each other.

In summary, the touch driving unit 400 may detect the amplitude of the touch signal RX by delaying the second touch sensing signal RXS2 by the phase delay amount and then sensing the touch signal RX.

Finally, the touch driving unit 400 calculates touch data based on the sensed voltages of the touch signal RX (S500).

The touch driving unit 400 may detect the sensed voltages of the touch signal RX according to the first cycle Ti of the second touch sensing signal RXS2. The touch driving unit 400 may generate second touch sensing data TDS2 based on the detected sensed voltage.

The touch driving unit 400 of the display device 10 according to the present disclosure may supply the touch driving signals TX to the plurality of driving electrodes TE of the touch unit TSU, and sense the change amounts in capacitance between the plurality of driving electrodes TE and the plurality of sensing electrodes RE. In addition, the touch driving unit 400 may calculate the phase delay amount of the touch signal RX by sensing the touch signal RX according to the first touch sensing signal RXS1 having a cycle different from that of the touch signal RX. Accordingly, the touch driving unit 400 may calculate the touch data by delaying the second touch sensing signal RXS2 by the phase delay amount and then sensing the touch signal RX. That is, the display device 10 may calculate the touch input and the touch coordinates based on the touch data.

Figure 17:
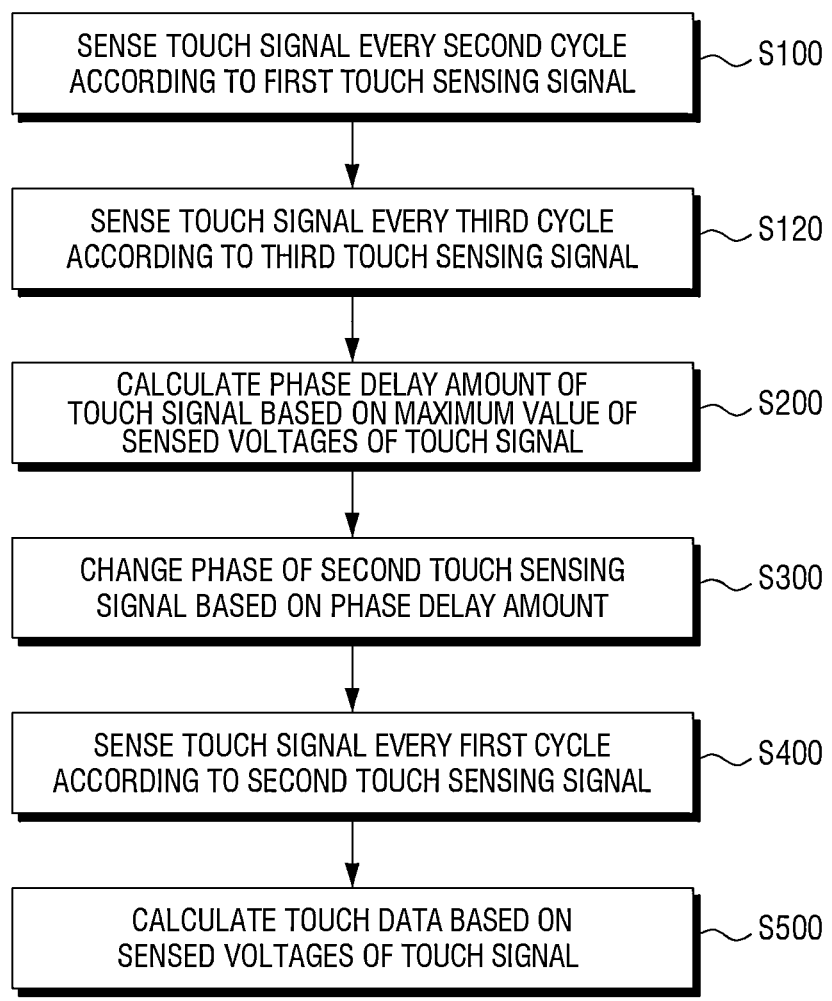
FIG. 17 is a flowchart illustrating processes of calculating touch data of the display device according to an embodiment.
Figure 18:
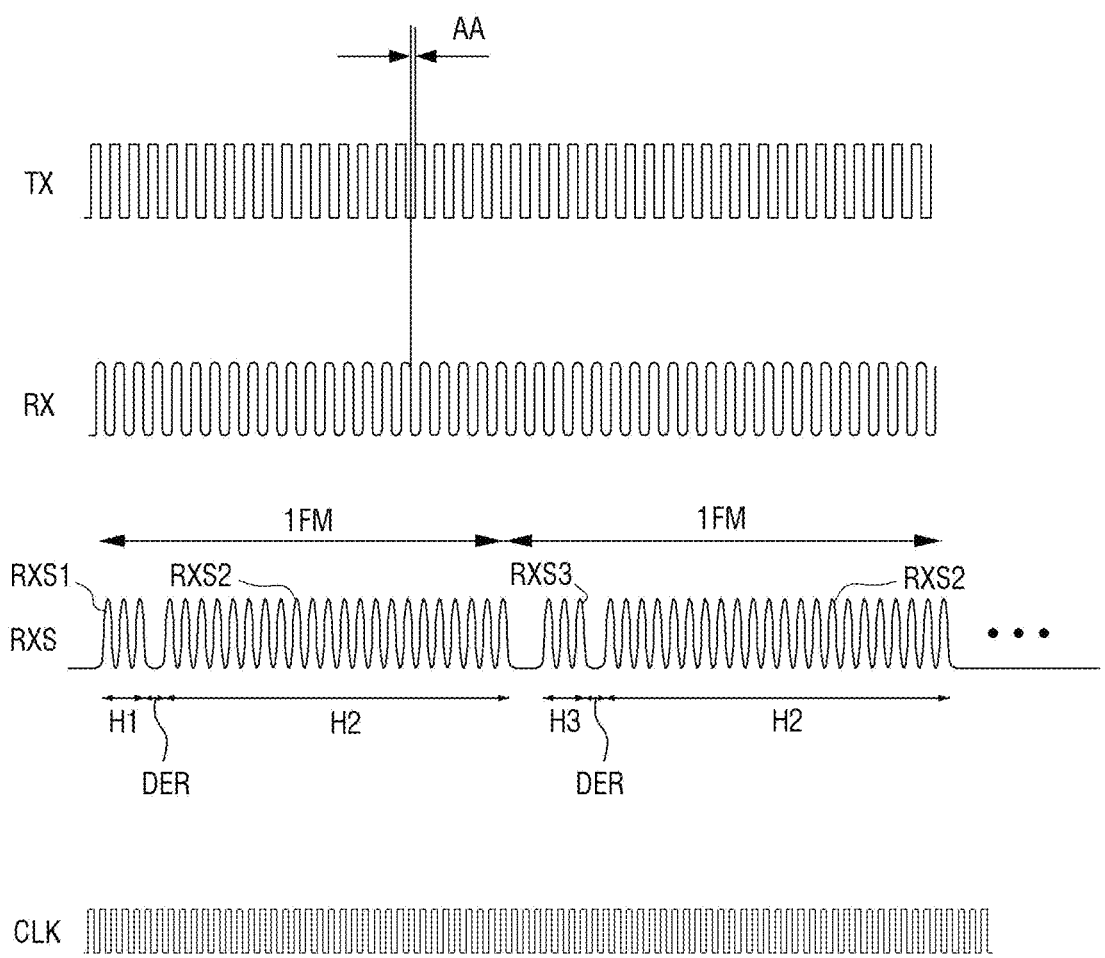
FIG. 18 is a timing diagram illustrating a touch driving signal, a touch signal, and a touch sensing signal of the display device according to an embodiment.
Figure 19:
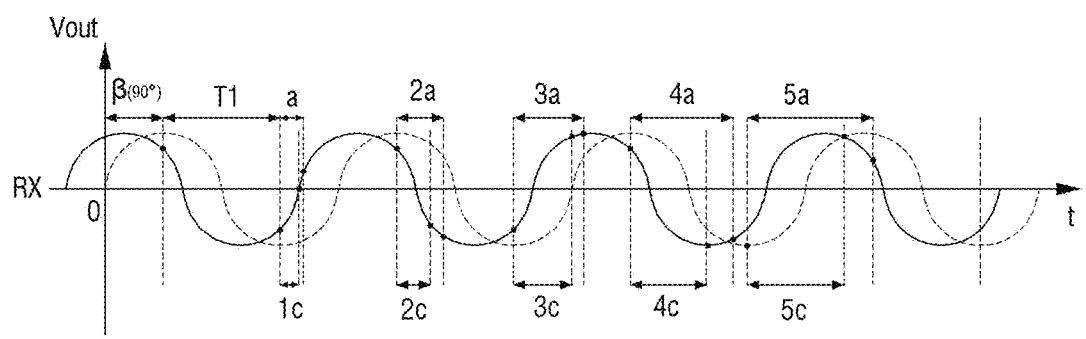
FIG. 19 is a timing diagram illustrating a touch signal according to an embodiment.
Figure 20:
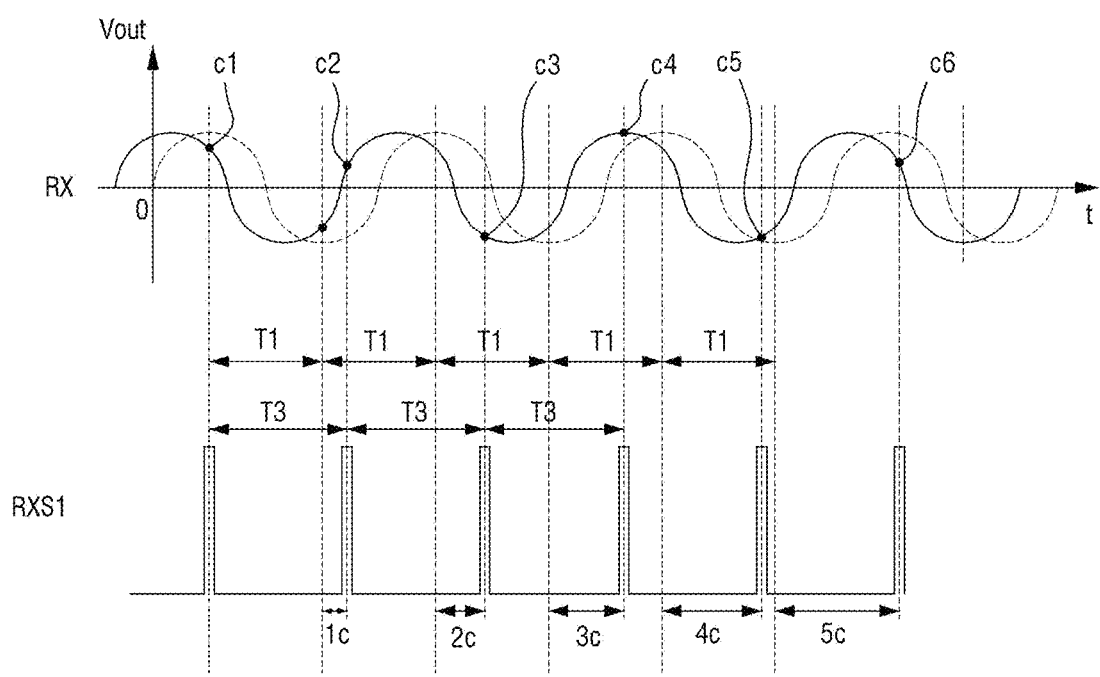
FIG. 20 is a timing diagram illustrating a touch signal, a first touch sensing signal, and third touch sensing data of the display device according to an embodiment.

FIG. 17 is a flowchart illustrating processes of calculating touch data of the display device according to an embodiment. FIG. 18 is a timing diagram illustrating a touch driving signal, a touch signal, and a touch sensing signal of the display device according to an embodiment. FIG. 19 is a timing diagram illustrating a touch signal according to an embodiment. FIG. 20 is a timing diagram illustrating a touch signal, a first touch sensing signal, and third touch sensing data of the display device according to an embodiment.

An embodiment of FIGS. 17 to 20 is substantially the same as an embodiment of FIGS. 13 to 16 except that a third touch sensing signal RXS3 is included in the touch sensing signal RXS. Accordingly, differences between an embodiment of FIGS. 17 to 20 and an embodiment of FIGS. 13 to 16 will be mainly described.

First, the touch driving unit 400 senses the touch signal RX every second cycle T2 according to the first touch sensing signal RXS1 (S100).

Referring further to FIG. 18, the touch driving unit 400 may sense the touch signal RX based on the touch sensing signal RXS. That is, the touch driving unit 400 may sense the touch signal RX at any cycle or frequency based on a cycle of the touch sensing signal RXS.

In an embodiment, the touch sensing signal RXS includes a first touch sensing section H1, a phase shift section DER, a second touch sensing section H2, and a third touch sensing section H3.

The touch sensing signal RXS includes a first touch sensing signal RXS1 generated during the first touch sensing section H1 and a second touch sensing signal RXS2 generated during the second touch sensing section H2. In addition, the touch sensing signal RXS includes the third touch sensing signal RXS3 generated during the third touch sensing section H3. The first touch sensing signal RXS1, the second touch sensing signal RXS2, and the third touch sensing signal RXS3 may repeatedly have high levels and low levels during one frame period 1FM. Each of first touch sensing signal RXS1, the second touch sensing signal RXS2, and the third touch sensing signal RXS3 may have one low level during one cycle. Each of the first touch sensing signal RXS1, the second touch sensing signal RXS2, and the third touch sensing signal RXS3 may be a sine wave, a pulse wave, or a ramp wave having a predetermined frequency, but is not limited thereto. Accordingly, the touch driving unit 400 may detect sensed voltages of the touch signal RX according to the high levels of the first touch sensing signal RXS1, the second touch sensing signal RXS2, and the third touch sensing signal RXS3.

The touch driving unit 400 may sense the touch signal RX according to the first touch sensing signal RXS1. For example, the first touch sensing signal RXS1 may have a high level every second cycle T2. Accordingly, the touch driving unit 400 may repeatedly sense the touch signal RX every second cycle T2. In an embodiment, the first cycle Ti is smaller than the second cycle T2 by a first interval 1a.

Accordingly, as described above, the touch signal RX has the first cycle Ti, and the first touch sensing signal RXS1 has the second cycle T2. In addition, the first cycle Ti is smaller than the second cycle T2 by the first interval 1a. Accordingly, when the touch driving unit 400 senses the touch signal RX every second cycle T2, phases of sensed points may be different from each other. For example, the touch driving unit 400 may detect sensed voltages by sensing the touch signal RX at each of first to sixth points a1 to a6 every second cycle T2. In this case, phases of the first to sixth points a1 to a6 may be gradually delayed by any value. Specifically, the first point a1 may be a point having a phase delayed from that of the touch signal RX by the first interval 1a. In addition, the second to sixth points a2 to a6 may be points having phases delayed from those of the touch signal RX by second to sixth intervals 2a to 6a, respectively. The first touch sensing signal RXS1 is substantially the same as that of an embodiment of FIGS. 13 to 16, and a description thereof will thus be omitted.

Next, the touch driving unit 400 senses the touch signal RX every third cycle T3 according to the third touch sensing signal RXS3 (S120).

Referring further to FIGS. 19 and 20, the touch driving unit 400 may sense the touch signal RX according to the third touch sensing signal RXS3. For example, the third touch sensing signal RXS3 may have a high level every third cycle T3. Accordingly, the touch driving unit 400 may repeatedly sense the touch signal RX every third cycle T3. In an embodiment, the third cycle T3 is greater than the first cycle T1 by a first interval 1c.

Accordingly, as described above, the touch signal RX has the first cycle Ti, and the third touch sensing signal RXS3 has the third cycle T3. In addition, the third cycle T3 is greater than the first cycle T1 by the first interval 1c. Accordingly, when the touch driving unit 400 senses the touch signal RX every third cycle T3, phases of sensed points may be different from each other. For example, the touch driving unit 400 may detect sensed voltages by sensing the touch signal RX at each of first to sixth points c1 to c6 every third cycle T3. In this case, phases of the first to sixth points c1 to c6 may be gradually delayed by any value. Specifically, the second point c2 may be a point having a phase delayed from that of the touch signal RX by the first interval 1c. In addition, the third to sixth points c3 to c6 may be points having phases delayed from those of the touch signal RX by second to sixth intervals 2c to 5c, respectively.

The touch driving unit 400 may calculate the touch data TSD by sensing the touch signal RX based on the first touch sensing signal RXS1 and the second touch sensing signal RXS2 during any one frame period 1FM of a plurality of frames (or frame periods) of the touch sensing signal RXS, as described in an embodiment of FIGS. 13 to 16. In addition, the touch driving unit 400 may calculate the touch data TSD by sensing the touch signal RX based on the third touch sensing signal RXS3 and the second touch sensing signal RXS2 during another frame period 1FM of the plurality of frames (or frame periods) of the touch sensing signal RXS.

In summary, as in an embodiment of FIG. 19, the touch driving unit 400 senses the touch signal RX every second cycle T2 according to the first touch sensing signal RXS1, and senses the touch signal RX every third cycle T3 according to the third touch sensing signal RXS3. In an embodiment, the third cycle T3 is greater than the first cycle T1, and thus, timings at which the touch driving unit 400 senses the touch signal RX may be different from each other.

Next, the touch driving unit 400 calculates a phase delay amount of the touch signal RX based on a maximum value of the sensed voltages of the touch signal RX (S200).

Referring further to FIG. 20, the touch driving unit 400 may detect the sensed voltages of the touch signal RX according to the third cycle T3 of the third touch sensing signal RXS3. The touch driving unit 400 may generate third touch sensing data TDS3 based on the detected sensed voltages.

The touch driving unit 400 may detect a maximum value of the third touch sensing data TDS3 of the touch signal RX as an amplitude of the touch signal RX. The touch driving unit 400 may calculate an interval of a point having the maximum value of the third touch sensing data TDS3 as a phase delay amount. For example, the third touch sensing data TDS3 has a maximum sensed voltage VM at the fourth point c4. A phase of the fourth point c4 of the third touch sensing data TDS3 may be delayed by a third interval 3c. That is, the touch driving unit 400 may calculate the third interval 3c of the fourth point c4 having the maximum value of the third touch sensing data TDS3 as the phase delay amount AA of the touch signal RX.

The maximum value of the third touch sensing data TDS3 may be substantially the same as the amplitude of the touch signal RX, but is not limited thereto. For example, the maximum value of the third touch sensing data TDS3 may have a value smaller than the amplitude of the touch signal RX, but when the first interval 1c is smaller than the first cycle T1, the maximum value of the third touch sensing data TDS3 may be substantially the same as the amplitude of the touch signal RX.

The touch driving unit 400 may calculate the amplitude of the touch signal RX by comparing a maximum value of the touch signal RX detected by the first touch sensing signal RXS1 with a maximum value of the touch signal RX detected by the third touch sensing signal RXS3. For example, the touch driving unit 400 may calculate the maximum value of the touch signal RX detected by the third touch sensing signal RXS3 as the amplitude of the touch signal RX when the maximum value of the touch signal RX detected by the first touch sensing signal RXS1 is smaller than the maximum value of the touch signal RX detected by the third touch sensing signal RXS3.

Next, the touch driving unit 400 changes a phase of the second touch sensing signal RXS2 based on the phase delay amount (S300), and senses the touch signal RX every first cycle Ti according to the second touch sensing signal RXS2 (S400). Finally, the touch driving unit 400 calculates touch data based on the sensed voltages of the touch signal RX (S500). A description thereof is substantially the same as that of an embodiment of FIGS. 13 to 16, and will thus be omitted.

In summary, the touch driving unit 400 may detect the amplitude of the touch signal RX by delaying the second touch sensing signal RXS2 by the phase delay amount and then sensing the touch signal RX. The touch driving unit 400 may detect the sensed voltages of the touch signal RX according to the first cycle Ti of the second touch sensing signal RXS2. The touch driving unit 400 may generate second touch sensing data TDS2 based on the detected sensed voltage.

The touch driving unit 400 of the display device 10 according to the present disclosure may supply the touch driving signals TX to the plurality of driving electrodes TE of the touch unit TSU, and sense the change amounts in capacitance between the plurality of driving electrodes TE and the plurality of sensing electrodes RE. In addition, the touch driving unit 400 may calculate the phase delay amount of the touch signal RX by sensing the touch signal RX according to the first touch sensing signal RXS1 and the third touch sensing signal RXS3 having cycles different from that of the touch signal RX. Accordingly, the touch driving unit 400 may calculate the touch data by delaying the second touch sensing signal RXS2 by the phase delay amount and then sensing the touch signal RX. That is, the display device 10 may calculate the touch input and the touch coordinates based on the touch data.

Figure 21:
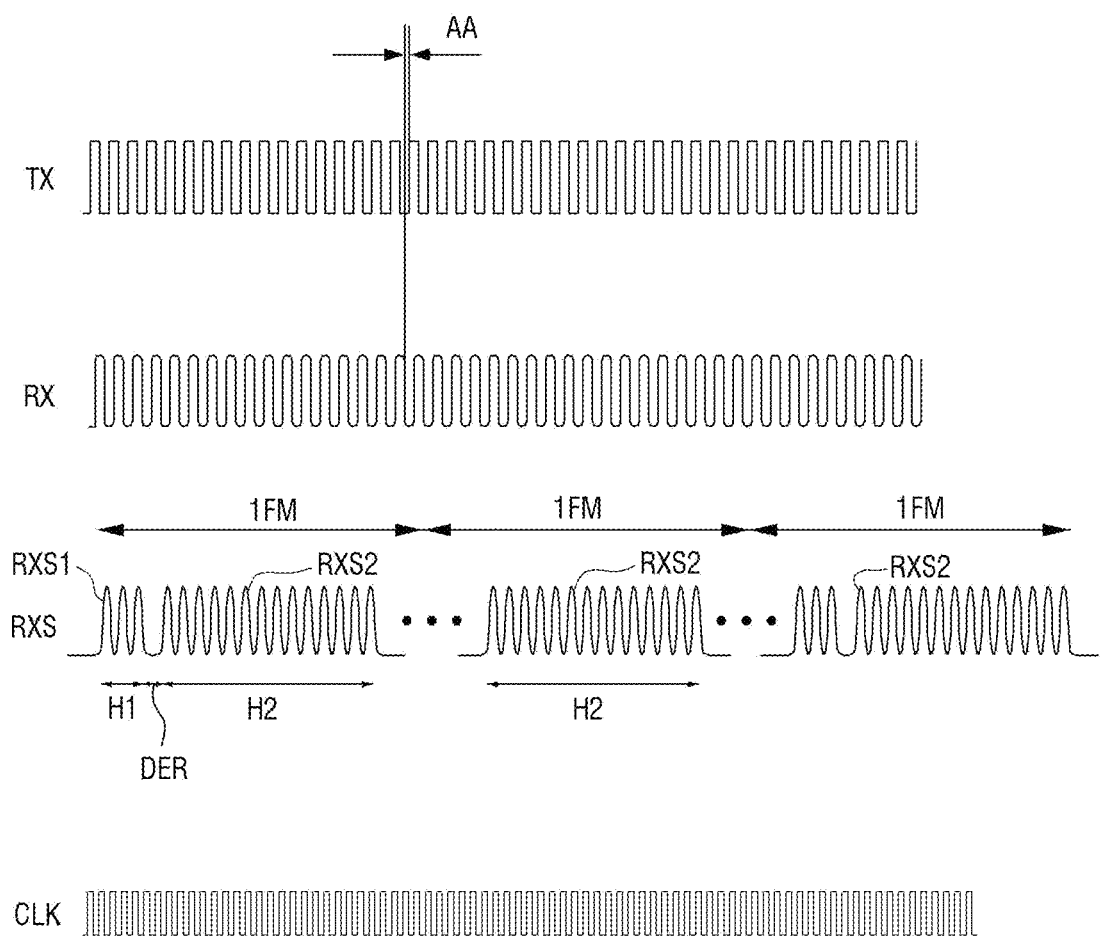
FIG. 21 is a timing diagram illustrating a touch driving signal, a touch signal, and a touch sensing signal of the display device according to an embodiment.

FIG. 21 is a timing diagram illustrating a touch driving signal, a touch signal, and a touch sensing signal of the display device according to an embodiment.

An embodiment of FIG. 21 is substantially the same as an embodiment of FIGS. 13 to 16 except for a timing of the first touch sensing signal RXS1 of the touch sensing signal RXS. Accordingly, differences between an embodiment of FIG. 21 and an embodiment of FIGS. 13 to 16 will be mainly described.

Referring to FIG. 21, the touch driving unit 400 may drive the touch unit TSU at any driving frequency. The touch driving signal TX may repeatedly have high levels and low levels during one frame period 1FM. The touch driving signal TX may have one low level during one cycle. One cycle of the touch driving signal TX may be a first cycle T1. The touch driving signal TX may be a signal having a plurality of driving pulses. The touch driving signal TX may be a sine wave, a pulse wave, or a ramp wave having a predetermined frequency, but is not limited thereto.

The touch driving unit 400 may receive the touch signal RX through a sensing line. The touch signal RX may repeatedly have high levels and low levels during one frame period 1FM. The touch signal RX may have one low level during one cycle. One cycle of the touch signal RX may be a first cycle Ti. That is, a cycle of the touch signal RX may be substantially the same as the first cycle Ti of the touch driving signal TX. The touch signal RX may be a signal having a plurality of pulses having an analog waveform. The touch signal RX may be a sine wave having a predetermined frequency, but is not limited thereto. A description of the touch driving signal TX and the touch signal RX are substantially the same as that of an embodiment of FIGS. 12 to 16, and will thus be omitted.

The touch driving unit 400 may sense the touch signal RX based on the touch sensing signal RXS. That is, the touch driving unit 400 may sense the touch signal RX at any cycle or frequency based on a cycle of the touch sensing signal RXS.

The touch sensing signal RXS may include a first touch sensing section H1, a phase shift section DER, and a second touch sensing section H2.

The touch sensing signal RXS includes a first touch sensing signal RXS1 generated during the first touch sensing section H1 and a second touch sensing signal RXS2 generated during the second touch sensing section H2. The first touch sensing signal RXS1 and the second touch sensing signal RXS2 may repeatedly have high levels and low levels during one frame period 1FM. Each of the first touch sensing signal RXS1 and the second touch sensing signal RXS2 may have one low level during one cycle. Each of the first touch sensing signal RXS1 and the second touch sensing signal RXS2 may be a sine wave, a pulse wave, or a ramp wave having a predetermined frequency, but is not limited thereto. Accordingly, the touch driving unit 400 may detect the sensed voltages of the touch signal RX according to the high levels of the first touch sensing signal RXS1 and the second touch sensing signal RXS2.

The touch driving unit 400 may calculate the touch data TSD by sensing the touch signal RX based on the first touch sensing signal RXS1 and the second touch sensing signal RXS2 during any one frame period 1FM of a plurality of frames of the touch sensing signal RXS. In addition, the touch driving unit 400 may calculate the touch data TSD by sensing the touch signal RX based on the second touch sensing signal RXS2 during another frame period 1FM of the plurality of frames of the touch sensing signal RXS. In this case, the second touch sensing signal RXS2 may be a signal having a phase delayed by the touch driving unit 400 during any one frame period 1FM.

In summary, the touch driving unit 400 may calculate the phase delay amount of the touch signal RX by generating the first touch sensing signal RXS1 in some frames (or frame periods) of the touch sensing signal RXS. Accordingly, the touch driving unit 400 may delay the phase of the second touch sensing signal RXS2, and accordingly, may detect the touch signal RX to calculate the touch data TSD. For example, the touch sensing signal RXS may include both the first touch sensing signal RXS1 and the second touch sensing signal RXS2 during a first frame period and then the touch sensing signal RXS may include only the second touch sensing signal RXS2 during a second frame period sequential to the first frame period.

Also in the display device 10 according to the present embodiment, the touch driving unit 400 may calculate the phase delay amount of the touch signal RX by sensing the touch signal RX according to the first touch sensing signal RXS1 having a cycle different from that of the touch signal RX. Accordingly, the touch driving unit 400 may calculate the touch data by delaying the second touch sensing signal RXS2 by the phase delay amount and then sensing the touch signal RX. That is, the display device 10 may calculate the touch input and the touch coordinates based on the touch data.

Figure 22:
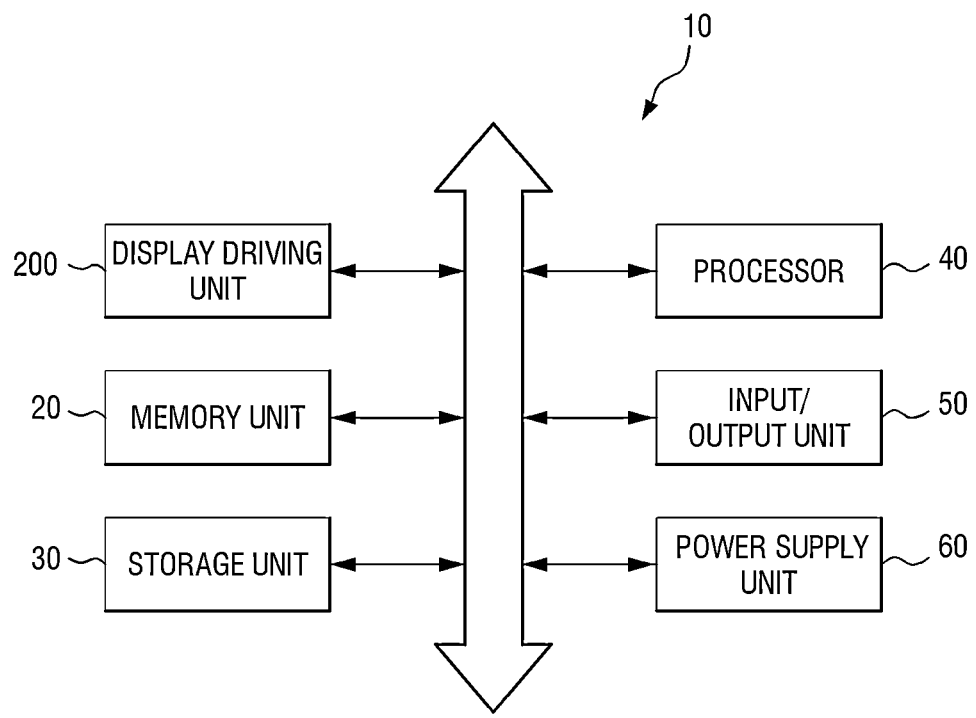
FIG. 22 is a block diagram illustrating the display device according to an embodiment.

FIG. 22 is a block diagram illustrating the display device according to an embodiment.

Referring to FIG. 22, the display device 10 may include a display driving unit 200, a memory unit 20, a storage unit 30, a processor 40, an input/output unit 50, and a power supply unit 60.

The memory unit 20 may store data used for operations of the display device 10. For example, the memory unit 20 may include a non-volatile memory unit such as an erasable programmable read-only memory (EPROM), an electrically erasable programmable read-only memory (EEPROM), a flash memory, a phase change random access memory (PRAM), and a resistance random access memory (RRAM) or a volatile memory unit such as a dynamic random access memory (DRAM) or a static random access memory (SRAM).

The storage unit 30 may include a solid state drive (SSD), a hard disk drive (HDD), a compact disk read-only memory (CD-ROM), and the like.

The processor 40 may perform a specific calculation or task. The processor 40 may be a microprocessor, a central processing unit (CPU), or the like. The processor 40 may be connected to other components through a bus or the like. The input/output unit 50 may include an input means such as a keyboard, a keypad, a touch pad, a touch screen, and a mouse, and an output means such as a speaker and a printer. The power supply unit 60 may supply power required for the operations of the display device 10.

While the present disclosure has been particularly shown and described with reference to embodiments thereof, it will be understood by those of ordinary skill in the art that various changes in form and detail may be made therein without departing from the spirit and scope of the present disclosure as defined by the following claims. The embodiments of the present disclosure described herein should be considered in a descriptive sense only and not for purposes of limitation.

What is claimed is:

1. A display device comprising:
 a display layer including a plurality of pixels;
 a touch layer disposed on the display layer and including a plurality of driving electrodes and a plurality of sensing electrodes; and
 a touch driving circuit supplying touch driving signals to the plurality of driving electrodes, receiving touch signals from the plurality of sensing electrodes, and generating a touch sensing signal including first and second touch sensing signals,
 wherein the touch driving circuit receives one of the touch signals, detects first sensed voltages of the one touch signal every first cycle of the first touch sensing signal to calculate a phase delay amount of the touch signal, delays a phase of the second touch sensing signal based on the phase delay amount, detects second sensed voltages of the one touch signal every second cycle of the second touch sensing signal different from the first cycle, and recognizes a touch input based on the second sensed voltages.

2. The display device of claim 1, wherein the first cycle is greater than the second cycle.

3. The display device of claim 2, wherein a third cycle of the one touch signal is the same as the second cycle.

4. The display device of claim 2, wherein the second sensed voltages of the one touch signal detected every second cycle of the second touch sensing signal are the same as an amplitude of the touch signal.

5. The display device of claim 1, wherein the touch sensing signal includes a first touch sensing section and a second touch sensing section, and the first touch sensing signal is generated during the first touch sensing section and the second touch sensing signal is generated during the second touch sensing section.

6. The display device of claim 5, wherein the first touch sensing section is shorter than the second touch sensing section.

7. The display device of claim 5, wherein the touch sensing signal further includes a phase delay section for delaying the phase of the second touch sensing signal according to the phase delay amount.

8. The display device of claim 7, wherein the phase delay section is disposed between the first touch sensing section and the second touch sensing section.

9. The display device of claim 1, wherein the touch driving circuit calculates an interval corresponding to a maximum sensed voltage of the first sensed voltages of the one touch signal detected every first cycle of the first touch sensing signal, as the phase delay amount.

10. The display device of claim 1, wherein the touch sensing signal includes a plurality of frame periods, and the first touch sensing signal is generated in at least one of the plurality of frame periods of the touch sensing signal.

11. The display device of claim 1, wherein the touch driving circuit comprises:
an amplitude detector calculating the first sensed voltages of the one touch signal according to the first touch sensing signal; and
a detection frequency controller calculating the phase delay amount of the one touch signal according to the first sensed voltages of the one touch signal.

12. The display device of claim 11, wherein the detection frequency controller outputs the second touch sensing signal to the amplitude detector according to a phase delay amount of the one touch signal.

13. The display device of claim 12, wherein the amplitude detector detects the second sensed voltages of the one touch signal according to the second touch sensing signal to generate touch sensing data.

14. The display device of claim 13, wherein the touch driving circuit further includes an analog-to-digital converter generating touch data having a digital waveform based on the touch sensing data.

15. A display device comprising:
a display layer including a plurality of pixels;
a touch layer disposed on the display layer and including a plurality of driving electrodes and a plurality of sensing electrodes; and
a touch driving circuit supplying touch driving signals to the plurality of driving electrodes, receiving touch signals from the plurality of sensing electrodes, and generating a touch sensing signal including first and second touch sensing signals,
wherein the touch driving circuit receives one of the touch signals, detects first sensed voltages of the one touch signal every first cycle of the first touch sensing signal to calculate a phase delay amount of the one touch signal, and calculates second sensed voltages of the one touch signal every second cycle of the second touch sensing signal different from the first cycle to calculate a touch input, and
wherein a difference between a phase of the first touch sensing signal and a phase of the second touch sensing signal is the same as the phase delay amount.

16. The display device of claim 15, wherein the first cycle is greater than the second cycle.

17. The display device of claim 16, wherein a third cycle of the one touch signal is the same as the second cycle.

18. The display device of claim 15, wherein the touch sensing signal includes a first touch sensing section and a second touch sensing section, and
the first touch sensing signal is generated during the first touch sensing section and the second touch sensing signal is generated during the second touch sensing section.

19. The display device of claim 18, wherein the first touch sensing section is shorter than the second touch sensing section.

20. The display device of claim 18, wherein the touch sensing signal further includes a phase delay section for delaying the phase of the second touch sensing signal according to the phase delay amount.

* * * * *